(12) United States Patent
    Blomqvist et al.

(10) Patent No.: US 11,209,271 B2
(45) Date of Patent: Dec. 28, 2021

(54) MICROELECTROMECHANICAL DEVICE FOR DETECTION OF ROTATIONAL MOTION

(71) Applicant: MURATA MANUFACTURING CO., LTD., Nagaokakyo (JP)

(72) Inventors: Anssi Blomqvist, Helsinki (FI); Ville-Pekka Rytkönen, Klaukkala (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 34 days.

(21) Appl. No.: 16/589,595

(22) Filed: Oct. 1, 2019

(65) Prior Publication Data
    US 2020/0124418 A1    Apr. 23, 2020

(30) Foreign Application Priority Data
    Oct. 18, 2018  (FI) ...................... 20185879

(51) Int. Cl.
    *G01C 19/5712*  (2012.01)
    *G01C 19/5733*  (2012.01)
    *G01C 19/5769*  (2012.01)
    *G01P 15/02*    (2013.01)

(52) U.S. Cl.
    CPC ..... *G01C 19/5712* (2013.01); *G01C 19/5733* (2013.01); *G01C 19/5769* (2013.01); *G01P 15/02* (2013.01)

(58) Field of Classification Search
    CPC ........... G01C 19/5712; G01C 19/5733; G01C 19/5769; G01C 19/5705; G01C 19/574; G01C 19/5747; G01P 15/02

USPC ............. 73/504.02, 502.03, 502.04, 504.12, 73/514.32
    See application file for complete search history.

(56) References Cited

U.S. PATENT DOCUMENTS

| 6,679,055 B1 * | 1/2004 | Ellis ..................... B81B 3/0035 310/306 |
| 6,761,068 B1 | 7/2004 | Schmid |
| 2006/0261032 A1 * | 11/2006 | Krishnamoorthy ......................... G02B 26/0833 216/2 |
| 2009/0108193 A1 * | 4/2009 | Kostiainen ............ H01J 49/168 250/282 |
| 2010/0037690 A1 | 2/2010 | Guenthner et al. |
| 2010/0218605 A1 | 9/2010 | Blomqvist et al. |

(Continued)

FOREIGN PATENT DOCUMENTS

| JP | 2012-519295 A | 8/2012 |
| JP | 2014-182133 A | 9/2014 |
| JP | 2018-100966 A | 6/2018 |

OTHER PUBLICATIONS

Finnish Search Report dated May 8, 2019 corresponding to Finnish Patent Application No. 20185879.

(Continued)

*Primary Examiner* — Robert R Raevis
(74) *Attorney, Agent, or Firm* — Squire Patton Boggs (US) LLP

(57) ABSTRACT

An improved design for a microelectromechanical device that enables multi-axis detection but is also more robust in demanding operating conditions. The device has a balanced structure formed of two oscillating inertial masses, coupled in a way that optimally utilizes inherent stiffnesses of spring structures to increase robustness of the combined device structure.

22 Claims, 10 Drawing Sheets

(56) References Cited

U.S. PATENT DOCUMENTS

| | | |
|---|---|---|
| 2010/0222998 A1 | 9/2010 | Blomqvist |
| 2010/0313657 A1 | 12/2010 | Trusov et al. |
| 2013/0192365 A1 | 8/2013 | Zhuang et al. |
| 2013/0205897 A1 | 8/2013 | Deimerly et al. |
| 2013/0213134 A1 | 8/2013 | Mao |
| 2014/0260610 A1 | 9/2014 | McNeil et al. |
| 2014/0264900 A1* | 9/2014 | Feyh .................. H01L 21/3142 257/773 |
| 2015/0068308 A1* | 3/2015 | Blomqvist ......... G01C 19/5712 73/504.12 |

OTHER PUBLICATIONS

Mar. 16, 2020 Search Report issued in European Patent Application No. 19202973.

\* cited by examiner

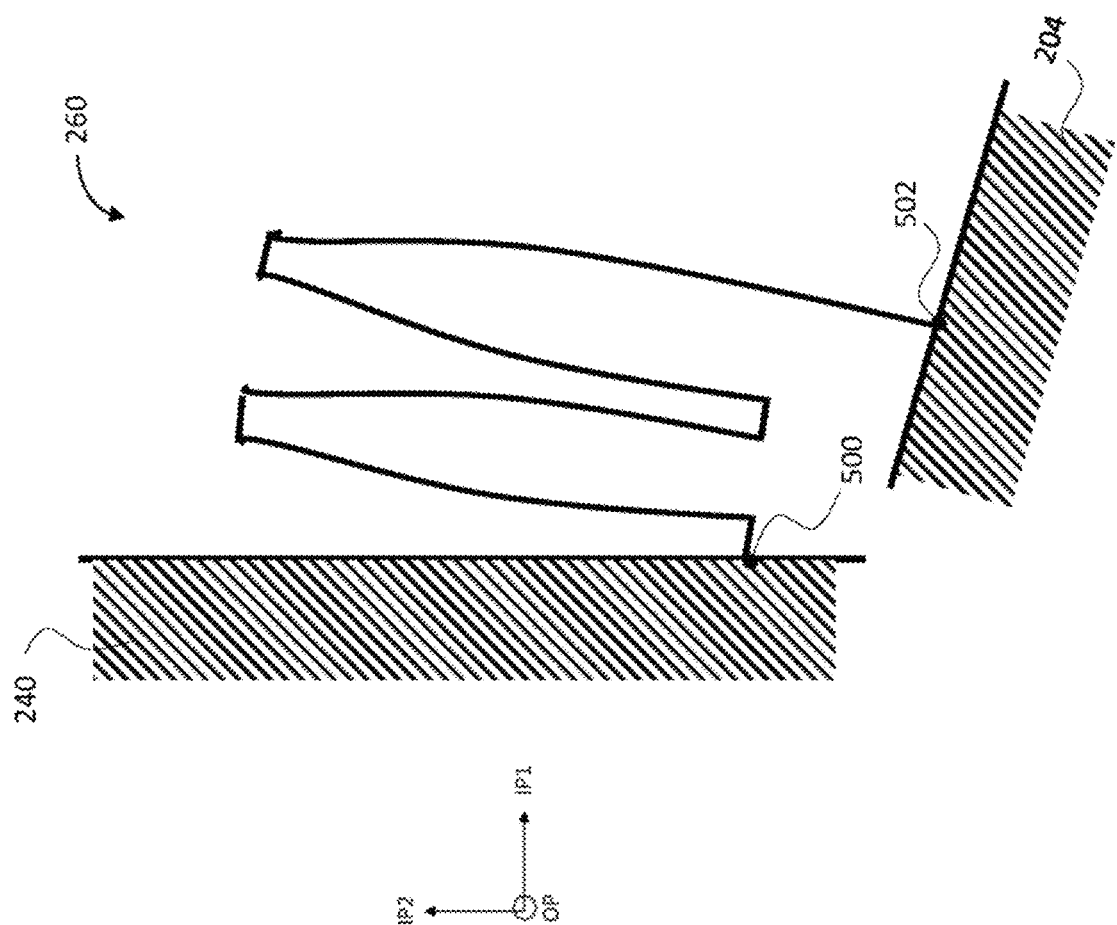
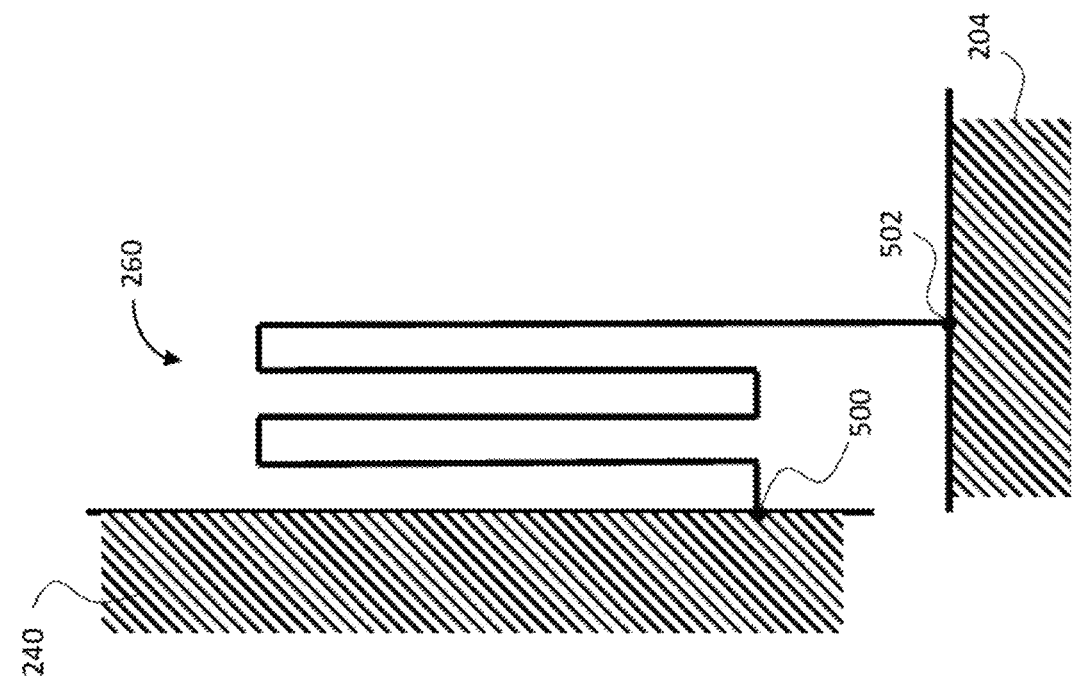
Figure 5B
Figure 5A

MICROELECTROMECHANICAL DEVICE FOR DETECTION OF ROTATIONAL MOTION

FIELD OF THE DISCLOSURE

The present disclosure relates to microelectromechanical devices, and more particularly to devices configured for detecting angular motion through Coriolis forces.

BACKGROUND OF THE DISCLOSURE

A microelectromechanical device can be made to move with an object to measure acceleration upon it. For this, the micromechanical device typically includes movable inertial mass structures, and acceleration forces acting on the micromechanical device can be measured by detecting displacements of these masses relative to fixed electrodes. FIG. 1 shows a side view illustrating basic elements of a microelectromechanical device.

The microelectromechanical device comprises a support 100, and a device structure 102. The term support 100 refers herein to a rigid mechanical element that may be fixed to move with the measured object. Accordingly, the support is a structural element that provides a rigid, locally inert reference for movable elements of the microelectromechanical device. Movable elements of the microelectromechanical device can be suspended through deformable elements from the support. In a wafer structure, the support may be provided by a supporting layer underneath and separated by an out-of-plane gap from a structure layer into which the movable or deformable elements forming a device structure are patterned. The support and elements in the structure layer may, for example, be coupled to each other through one or more attachment regions protruding from the support. Alternatively, or additionally, the support may include a frame that is rigidly fixed to the support layer and surrounds some or all elements in the structure layer. The support may also be provided by or may include capping disposed above the device structure and separated from it by an out-of-plane gap.

The term device structure 102 refers herein to a combination of rigid and flexible elements that are jointly configured to constitute a defined mode of motion induced by acceleration acting upon the microelectromechanical device. In other words, the device structure includes inertial mass parts that are coupled flexibly to the support such that forces by accelerations in one or more measured directions induce defined modes of motion of the inertial masses. On the other hand, by mechanical design, deformations of the flexible parts are directional so that displacements or deformations of the device structure, caused by accelerations in any other directions, are minimized or do not have effect on the measurement function of the device. In the defined mode of motion, the displacements of at least part of the device structure can be capacitively detected and transformed into an electrical signal that very accurately represents the measured acceleration.

The structure layer into which the device structure is patterned has a mainly planar form. In an initial static state of the device, a plane of the device structure 102 forms a reference plane 104 for the device. The initial static state refers here to a situation where the device structure, suspended from the support, is acted upon by gravitation, but is not subject to any induced accelerations. The reference plane 104 may be considered to align with a plane, advantageously a central plane of the planar structure layer into which the device structure is patterned. In the example of FIG. 1, the reference plane 104 can be considered to align with a plane between the top surface and bottom surface of the device structure 102. A reference to an element extending in some direction in the reference plane can thus be interpreted as an element that is patterned from or into the originally planar structure layer. This means also that the out-of-plane dimension of the element in a device structure corresponds to the thickness of the structure layer. However, for some special functional purpose, elements can also be thinned during patterning.

In this disclosure, an orthogonal set of directions IP1, IP2, OP is applied as follows: a first in-plane direction IP1 and a second in-plane direction IP2 are pairwise orthogonal, and both parallel to the reference plane 104. An out-of-plane direction OP is normal to the reference plane 104, and thus orthogonal with respect to the first in-plane direction IP1 and the second in-plane direction IP2.

Motion has six degrees of freedom: translations in three orthogonal directions and rotations around three orthogonal axes. The latter three may be measured by an angular rate sensor, also known as a gyroscope. Microelectromechanical (MEMS) gyroscopes use the Coriolis Effect to measure the angular rate. When a mass is moving in one direction and rotational angular velocity is applied, the mass experiences a force in orthogonal direction as a result of the Coriolis effect. The resulting physical displacement caused by the Coriolis force may then be detected, for example, capacitively, piezoelectrically or piezoresistively by appropriate sensing structures commonly known in the art.

In microelectromechanical gyroscopes, the primary motion cannot be continuous rotation as in conventional ones due to lack of adequate bearings. Instead, mechanical oscillation may be used as the primary motion. When an oscillating gyroscope is subjected to an angular motion orthogonal to the direction of the primary motion, an undulating Coriolis force results. This induces a secondary oscillation orthogonal to the primary motion and to the axis of the angular motion, and at the frequency of the primary oscillation. The amplitude of this coupled oscillation can be used as the measure of angular rate.

In capacitive measurements, detection is based on change in the capacitance of an inertial mass that moves with respect to a static reference. For example, in the microelectromechanical device of FIG. 1, an inertial mass in the device structure 102 may be flexibly suspended to the support 100 and thus applied as a moving rotor electrode. The support 100 may include a static stator electrode and the capacitive measurement may be based on displacements of the inertial mass in the out-of-plane direction OP. Alternatively, the structure layer may include elements that are fixed to the support and elements that are flexibly suspended to the support. The fixed elements may then be used to provide stator electrodes, and the suspended elements to provide rotor electrodes. Capacitive measurements may then be based on displacements of the rotor electrodes with respect to the stator electrodes in either of the in-plane directions IP1, IP2. In a manner well known to a person skilled in the art, a pair of a stator electrode and a rotor electrode can be electrically coupled such that they detect a change in capacitance between them when the rotor electrode is displaced with respect to the stator electrode. This change can be converted into an analog voltage signal, which then through e.g. charge amplification, signal conditioning, demodulation, filtering, can be converted into digital form for further signal processing.

Typically, the structure layer of a device is very carefully designed to use the available area as efficiently as possible. Specifically, in many consumer MEMS applications, the structural device design enables sensing angular rates in two or even three directions. Such multi-axis configurations enable simpler electronics and low power consumption in reduced component size and with low cost. However, use of such multi-axis configurations in more demanding conditions, for example in automotive applications, is very limited because operating requirements in vehicle use are very challenging. The devices need to be very sensitive, but at the same they have to be very robust against external vibrations. This is a very difficult balance to implement with a multi-axis configuration that inherently needs to include various mass and spring elements to implement the plurality of different drive and sense functions.

BRIEF DESCRIPTION OF THE DISCLOSURE

An object of the present disclosure is to provide an improved design for a microelectromechanical device that enables multi-axis detection and is also more robust in demanding operating conditions.

The object of the disclosure is achieved by the device structure characterized by what is stated in the independent claim. The preferred embodiments of the disclosure are disclosed in the dependent claims.

The disclosure is based on a balanced structure formed by two oscillating inertial masses, and coupled in a special way that optimally utilizes inherent stiffnesses of spring structures to increase robustness of the combined device structure.

BRIEF DESCRIPTION OF THE DRAWINGS

In the following the disclosure will be described in greater detail by means of preferred embodiments with reference to the accompanying drawings, in which

FIGS. 5A and 5B illustrate a possible form for a spring system in FIG. 2;

DETAILED DESCRIPTION OF THE DISCLOSURE

Figure 1:
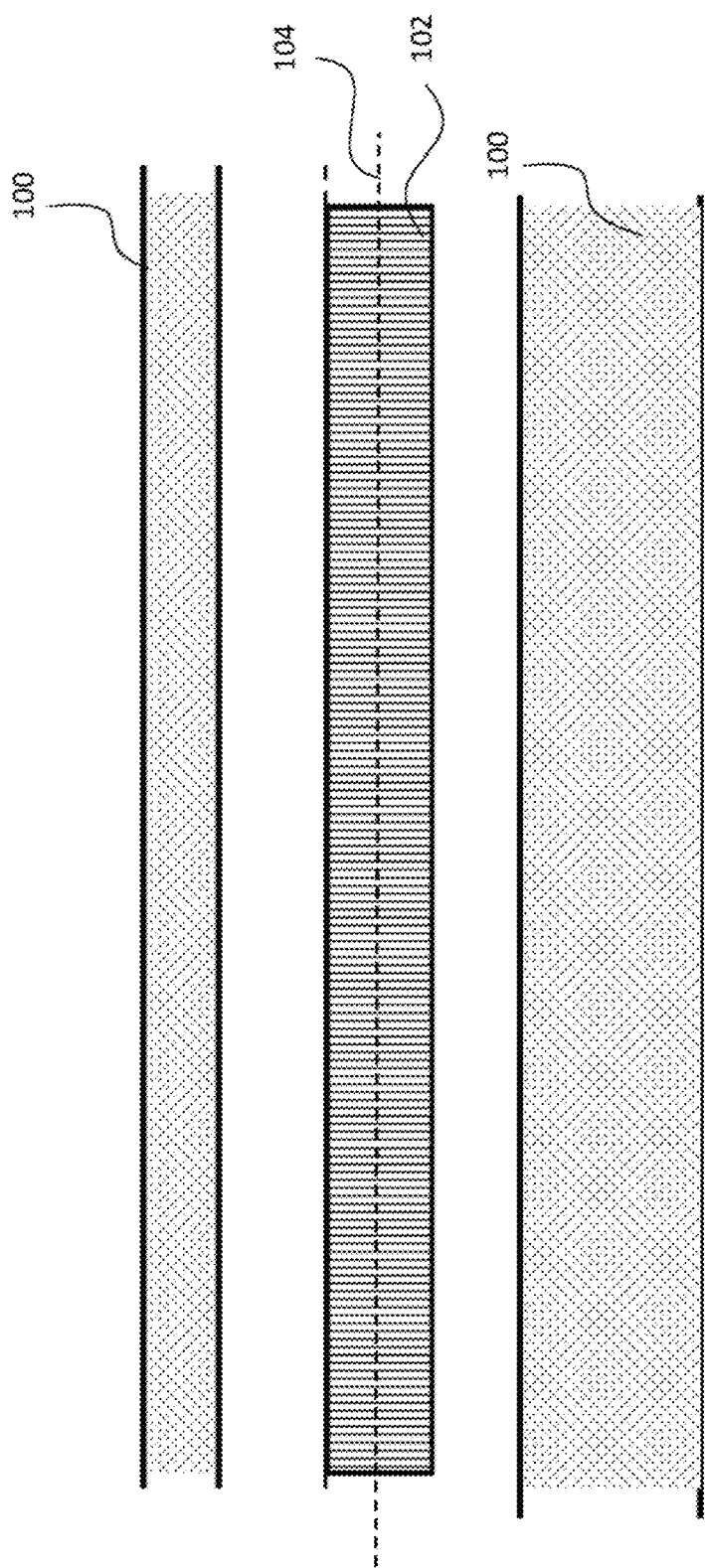
FIG. 1 shows a side view illustrating basic elements of a microelectromechanical device.
Figure 1:
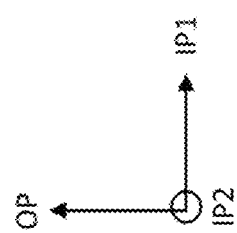
Figure 2:
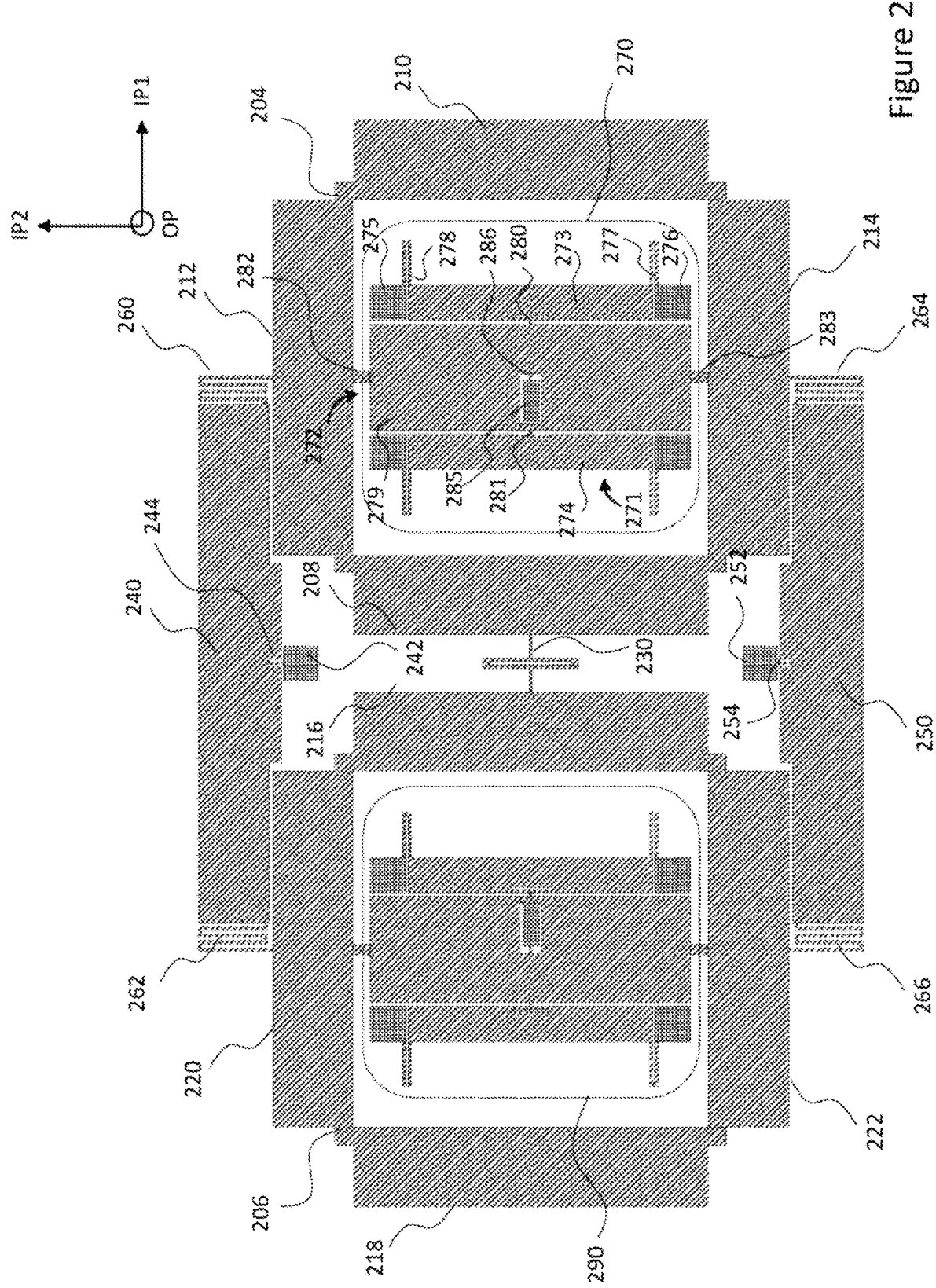
FIG. 2 illustrates an example of a novel device structure.

FIG. 2 illustrates a novel device structure that is formed of a planar structure layer in a way that eliminates, or at least alleviates the above described disadvantages.

In the shown example, the microelectromechanical device includes two inertial masses 204, 206 that extend side by side in the reference plane. In other words, the two inertial masses 204, 206 are close together, beside or near each other. Inertial mass refers herein to a mechanically rigid object that responds to external forces as a unitary body. The inertial masses 204, 206 have an essentially planar overall form. However, the overall planar form of an inertial mass may naturally include recesses and through-etched patterns to enable functional properties for the inertial mass, discussed in the following. Accordingly, in the initial static state of the microelectromechanical device, top or bottom surfaces of the two inertial masses 204, 206 extend in parallel with the reference plane of the microelectromechanical device.

Each of the inertial masses 204, 206 has edges in two orthogonal directions. In this disclosure, edges that extend mainly in the first in-plane direction IP1 are called as horizontal edges, and edges that extend mainly in the second in-plane direction IP2 are called as vertical edges. The term 'edge' refers herein to a surface forming a side of an inertial mass, which side faces one in-plane direction, and extends in the other orthogonal in-plane direction. Accordingly, the phrase 'extends mainly in the IPn in-plane direction' defines here that in at least part of the surface of a side in the IPn in-plane direction is parallel to the IPn in-plane direction, or that a tangent of the surface is at least in one point parallel to the IPn in-plane direction. Thus, the terms 'horizontal' and 'vertical' do not, and such, imply linearity or planarity of the edge forms. Each inertial mass has at least two horizontal edges, and at least two vertical edges. In addition to them, the inertial mass may include further structural edge forms, for example, the corner indentations shown in FIG. 2. FIG. 2 shows a first inertial mass 204 with a first vertical edge 208, a second vertical edge 210, a first horizontal edge 212 and a second horizontal edge 214. FIG. 2 shows also a second inertial mass 206 with a first vertical edge 216, a second vertical edge 218, a first horizontal edge 220 and a second horizontal edge 222.

Adjacent vertical edges of the inertial masses 204, 206 are coupled to each other by a spring structure 230 of a first spring system. In the example of FIG. 2, a first vertical edge 208 of the first inertial mass 204 is adjacent to a first vertical edge 216 of the second inertial mass 206. The first vertical edges 208, 216 of the inertial masses 204, 206 respectively are coupled to each other by means of the spring structure 230 of the first spring system.

In this disclosure, a spring structure refers to a patterned element of the device structure that due to its form is configured to mechanically resist some deformations flexibly and some deformations stiffly. The difference between stiffness of flexible and stiff deformations in a spring structure is advantageously of the order of ten or more. Accordingly, a spring structure may comprise one or more elastically deformable springs configured with mechanical design to provide a specific response upon forces added from different directions. A spring structure may additionally comprise intermediary rigid parts, like rigid frames or beams, in order to appropriately control the directional functioning of the spring structure. As the spring structures in this disclosure are patterned into the same structure layer as the inertial masses are produced, they tend to inherently stiffly resist bending in the out-of-plane direction.

For balanced dual operation of the inertial masses 204, 206, internal symmetry is a fundamental requirement. In this disclosure, a set of one or more similar spring structures configured to implement in combination a defined functional feature in modes of motion of both of the inertial masses 204, 206 is referred to as a spring system. Accordingly, in the following, separate spring structures will be defined in terms of their resistance (flexible or stiff) to deformations in specific degrees of freedom. Spring systems will be defined in terms of the result the respective combination of spring structures, which form the spring system, provides in the overall device structure.

In multi-axis devices, relatively high common structure layer thickness is required. However, a spring structure patterned into a thick structure layer does nor deform easily in the out-of-plane direction. Multi-axis functions require use of a plurality of directions for sense and detection motion, so provision of robust structure layer configuration capable of sensing rotary motions in two or more directions is therefore very challenging. For measurement of angular rates, the spring systems of the device need to enable a drive mode of motion, and at least two sense modes of motion, both induced by Coriolis forces resulting from a measured angular motion. The example of FIG. 2 enables two sense modes of motion. The three modes of motion enabled by the structure of FIG. 2 are illustrated with simplified schemes in FIGS. 3A-3C. These modes of motion are discussed in more detail in the following description.

Figure 3C:
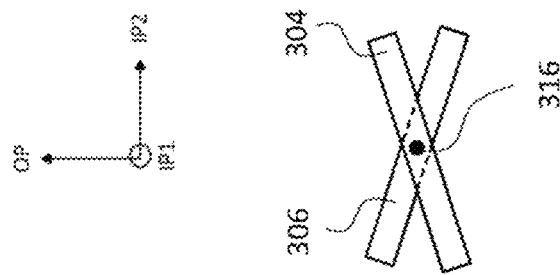
FIGS. 3A-3C illustrate three modes of motion enabled by the structure of FIG. 2.
Figure 3B:
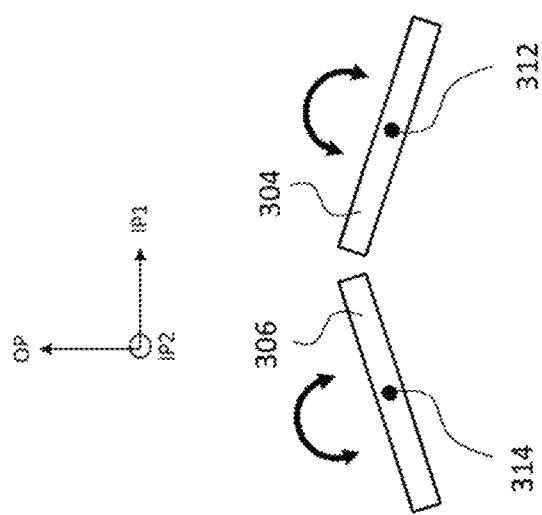
Figure 3A:
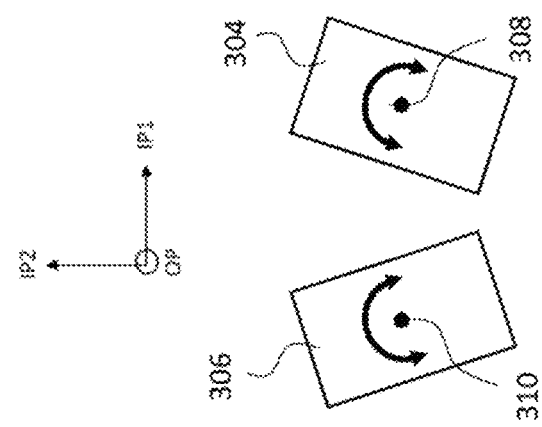

In FIGS. 3A-3C, a first mass 304 illustrates modes of motion of the first inertial mass 204 and a second mass 306 illustrates modes of motion of the second inertial mass 206. FIG. 3A is a top view of the inertial masses in the out-of-plane direction OP and shows a drive mode of motion of the structure. In the drive mode, the first mass 304 oscillates about a drive axis 308 and the second mass 306 oscillates about a drive axis 310. The drive axis 308 of the first mass and the drive axis 310 of the second mass are separated by a non-zero distance in the IP1 direction, and in the initial static state they are parallel to a the out-of-plane direction OP. FIG. 3B is a side view of the inertial masses in the second in-plane direction IP2 and shows an IP1 sense mode of motion of the structure. In the IP1 sense mode, the first mass 304 oscillates about a first sense axis 312 and the second mass 306 oscillates about a first sense axis 314. The first sense axis 312 of the first mass and the first sense axis 310 of the second mass are separated by a non-zero distance in the IP1 direction and in the initial static state are parallel to the second in-plane direction IP2. FIG. 3C is a side view of the inertial masses in the first in-plane direction IP1 and shows an IP2 sense mode of motion of the structure. In the IP2 sense mode, the first mass 304 and the second mass 306 oscillate about a common second sense axis 316 that in the initial static state is parallel to the first in-plane direction IP1. It is to be noted that the modes of motion are described herein separately in the initial static state with reference to the static reference plane. The motion of the inertial masses during operation typically includes components of at least one of these three intended modes of motion, and often components of some undesired phenomena, like quadrature error.

Returning back to FIG. 2, the spring structure 230 of the first spring system is configured to flex between the inertial masses 204, 206 in the drive mode of motion, couple adjacent edges of the inertial masses 204, 206 in parallel in the out-of-plane direction OP during the IP1 sense mode of motion and to provide the common axis of rotation in the first in-plane direction IP1 during the IP2 sense mode.

FIG. 2 shows one exemplary form for a spring structure 230 of the first spring system. The form of this spring structure 230 enables it to bend flexibly between the inertial masses 204, 206 in the second in-plane direction IP2, to twist flexibly between the inertial masses 204, 206 about a spring axis that is parallel to the first in-plane direction IP1. In addition, the form of the spring structure enables it to resist stiffly bending in the out-of-plan direction OP, or to bend symmetrically from the middle in the out-of-plane direction OP such that adjacent edges of the inertial masses 204, 206 coupled by the spring structure remain in the same level in the out-of-plane direction during the symmetrical bending.

These characteristics may be achieved with a variety of three-dimensional spring structures. FIG. 2 shows an example of a mainly elongate spring structure 230 in which the dimension of the spring structure 230 in the out-of-plane direction OP is a large multiple (typically more than 5) of the main dimension of the spring structure 230 in the second in-plane direction IP2, and wherein the dimension of the spring structure 230 in the first in-plane direction IP1 is at least five times the dimension of the spring structure 230 in the second in-plane dimension IP2. Due to this the spring structure 230 easily bends between the two inertial masses 204, 206 in the second in-plane direction IP2, allowing them to be driven into anti-phase rotational in-plane motion shown in FIG. 3A.

Figure 4:
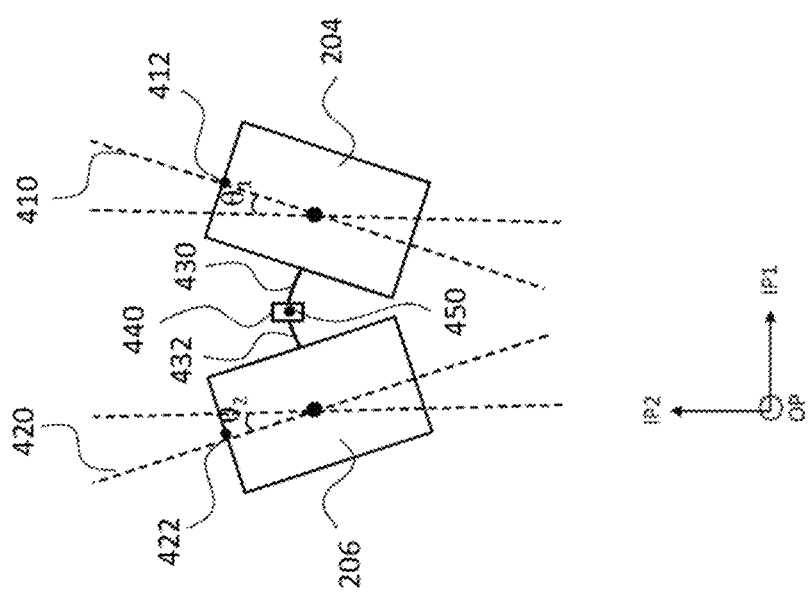
FIG. 4 shows in more detail the device structure of FIG. 2 at a stage of a drive mode of motion.

FIG. 4 shows in more detail the device structure of FIG. 2 at a stage of a drive mode of motion. As discussed earlier, the rotational motion of an element in a microelectromechanical device is typically mechanical oscillation about a point of equilibrium, in other words, cyclic vibratory motion of the element. Rotational in-plane motion refers herein to rotational oscillating motion of a planar element along a circular curve about an axis that is normal to the plane of the planar element. In the example of FIG. 4, axes 400, 402 normal to the inertial masses 204, 206 are parallel to the out-of-plane direction OP. A phase of motion of an inertial mass in the rotational in-plane motion corresponds here to an angle that a line to a point in the inertial mass makes with a reference in-plane axis direction, for example the direction of the second in-plane axis IP2. Accordingly, in anti-phase rotational in-plane motion, an angle θ1 that a line 410 to a selected point 412 in the first inertial mass 204 makes with the second in-plane direction IP2 can be considered to represent the phase of the first inertial mass 204. Correspondingly, an angle θ2 that a line 420 to a symmetrical point 422 in the second inertial mass 206 makes with the second in-plane direction IP2 can be considered to represent the phase of the second inertial mass 206. In the anti-phase rotational in-plane motion, absolute values of the angle θ1 and the angle θ2 are the same, but the angles have different polarity, i.e. have a different sign (θ1=−θ2).

The anti-phase rotational in-plane motion of two inertial masses is advantageous in that a temporal angular momentum of one inertial mass is at all times opposite a temporal angular momentum of the other inertial mass, so the drive motion of the two inertial masses is well balanced. Undesired external vibrations and shocks induce in-phase motion components, in other words tend to induce common mode of motion. In the shown configuration, this mode of motion is, however, effectively eliminated by the properties of the spring structure 230 of the first spring system.

As shown in FIG. 4, in anti-phase drive motion, a portion 430 of the spring structure 230 tries to move radially with the first inertial mass 204, and a portion 432 of the spring structure 230 tries to move radially with the second inertial mass 206. When the first inertial mass 204 has turned the angle θ1 about a rotation axis 400 in the clockwise direction and the second inertial mass 206 has turned the angle −θ1 (θ2) about a rotation axis 402 in the counterclockwise direction, the spring structure 230 functions like a beam that is supported at its ends and loaded transversally in the middle. Accordingly, the spring structure 230 bends in the middle, and forms essentially an arc, the center point 450 of which moves back and forth in the second in-plane direction IP2 during bending.

In the example of FIG. 4, the spring structure 230 includes an optional rectangular part 440 that encircles the center point 450 between the portions 430 and 432. This rectangular part 340 may be arranged in the middle of the spring structure to add to it some symmetrical flexibility also in the out-of-plane direction OP. The required coupling of the adjacent edges of the inertial masses 204, 206 can be implemented with a simple bending beam, without intermediate structural elements between the portions 430 and 432. However, the distance between the coupled edges varies slightly according to the amplitude of the oscillation in the IP1 sense mode of 3B, and for that a simple bending beam would provide a relatively stiff spring, unless it is made quite long. The rectangular part also allows the spring structure 230 of the first spring system to lengthen in the drive mode of motion without inducing excessive stress to the suspension, as shown in FIG. 4. The rectangular part thereby improves the linearity of the spring force with respect to drive displacement rotation.

For the undesired common mode of motion, the first inertial mass 204 would attempt to turn the angle θ1 about a rotation axis 400 in the clockwise direction and the second inertial mass 206 to turn the same angle θ1 (−θ2) about a rotation axis 402 in the clockwise direction. Accordingly, in this case the forces acting on the spring structure would attempt to deform it to S-shape form. However, it is easily understood that the spring structure 230 strongly resists such S-shape deformation.

As illustrated with FIG. 3B, when the inertial masses 204, 206 oscillate in the anti-phase in-plane rotary motion, angular rotation of the device about an axis in the first in-plane direction IP1 induces a Coriolis force that causes the inertial masses to rotate in anti-phase about respective axes that extend in parallel in the second in-plane direction IP2. Alternatively, angular rotation of the device about an axis in the second in-plane direction IP2 induces a Coriolis force that causes the inertial masses 204, 206 to rotate about a common axis that extends in the first in-plane direction IP1. The device may thus include circuitry configured to generate sense signals from motions of the two inertial masses 204, 206 in at least one, but even in both of the two in-plane directions. The circuitry may also be configured to use sense signals of the two inertial masses 204, 206 in differential detection. As both sense motions occur in anti-phase, temporal angular momenta of the inertial masses in either of the sense motions are at all times opposite, which means that the sense modes of motion of the two inertial masses in both sense directions are also well balanced. The disclosed structure with fully balanced modes in drive and even two sense motions thus enables provision of a multi-axis gyroscope device that is robust enough also for more challenging conditions, like the ones in safety critical automotive applications.

Returning again to FIG. 2, the device structure includes also one or more out-of-plane see-saw beam systems designed to increase robustness of the device structure. For an out-of-plane see-saw beam system, at least two horizontal edges facing the same direction in the two inertial masses 204, 206 may be coupled to opposite ends of an intermediate rigid beam, and the rigid beam may be configured to rotate about an axis that is parallel to the second in-plane direction IP2. The fulcrum of such out-of-plane see-saw beam system provides a mechanical point of connection to the support and stabilizes the inertial masses in the out-of-plane direction OP. The out-of-plane see-saw beam system also forces the inertial masses to move in opposite directions in the out-of-plane direction OP, and thus further eliminates common modes of motion, specifically in the IP2 sense mode.

The example of FIG. 2 includes two out-of-plane see-saw beam systems, alternative configurations will be discussed later in the description. In FIG. 2, horizontal edges 212, 220 facing the positive second in-plane direction IP2 have been coupled to one beam 240 and horizontal edges facing the negative second in-plane direction IP2 have been coupled to another beam 250. In more detail, FIG. 2 shows a first horizontal edge 212 of the first inertial mass 204 facing to the positive second in-plane direction IP2, and a first horizontal edge 220 of the second inertial mass 206 facing to the same direction. The first rigid beam 240 extends in the first in-plane direction IP1 and the first horizontal edge 212 in the first inertial mass 204 is coupled to one end of the first rigid beam 240. The first horizontal edge 220 in the second inertial mass 206 is coupled to the other end of the first rigid beam 240. The coupling of the first rigid beam 240 and the inertial masses 204, 206 is configured to form the out-of-plane see-saw beam system in which one of the inertial masses moves to the positive out-of-plane direction +OP when the other one of the inertial masses systems moves to the negative out-of-plane direction −OP, and the first rigid beam 240 pivots at a fulcrum that is basically a fixed hinge in the middle of the first rigid beam. The coupling of the second rigid beam 250 and the inertial masses 204, 206 is symmetrical and functions similarly.

In the out-of-plane see-saw beam systems of FIG. 2, the fulcrum is provided by a combination of an attachment to the support and a spring structure. Preferably, a line crossing the fulcrum of the out-of-plane see-saw beam system of the rigid beam 240 and the fulcrum of the out-of-plane see-saw beam system of the rigid beam 250 is in the middle between the inertial masses 204, 206, and crosses the center of the spring structure 230 of the first spring system.

Attachment to the support is provided by an attachment point, which refers herein to a region of the structure layer that is directly or indirectly fastened to a support, or part of the support protruding to the structure layer. An attachment point provides thus a locally static point of coupling for the one or more flexible parts of the out-of-plane see-saw beam systems. In this disclosure, a set of one or more attachment points configured to implement in combination a defined functional fastening feature for both of the inertial masses 204, 206 is referred to as an attachment element. Accordingly, in the following, attachment points will be defined in connection with spring structures to which they couple to provide a fixed attachment to the support. Attachment element will be defined in terms of the result that the respective combination of attachment points provides in the overall device structure.

A first attachment element is configured to provide a coupling point and at the same time a fulcrum for the one or more see-saw beam systems coupling the modes of motion of the inertial masses 204, 206. A second spring system is configured to couple the rigid beams 240, 250 in the one or more out-of-plane see-saw beam systems to the first attachment element. The first rigid beam 240 is coupled to an attachment point 242 of the first attachment element through a first spring structure 244 of the second spring system, and the second rigid beam 250 is coupled to an attachment point 252 of the first attachment element through a second spring structure 254 of the second spring system.

The first spring structure 244 is a torsional element configured to twist flexibly between the first attachment point 242 and the first rigid beam 240 about an axis that is parallel to the second in-plane direction IP2. One end of the first spring structure 244 may be fixed to the first attachment point 242 and the other end of the first spring structure 244 may be fixed to the center of the first rigid beam 240. In the example of FIG. 2, the first attachment point 242 is disposed inwards (towards the first spring system) from the first rigid beam 240, in a space left open by the inertial masses 204, 206. However, the attachment points can be disposed outward from their respective rigid beam, or inside their respective rigid beam, as well. Coupling between the second rigid beam 250 and a corresponding second attachment point 252 through the corresponding second spring structure 254 is similar to the coupling between elements 240, 242 and 246, only mirror symmetric.

A third spring system is configured to provide coupling between the rigid beams 240, 250 and the inertial masses 204, 206 in a manner that enables the drive mode of motion and the two sense modes of motion. In the device structure of FIG. 2, one end of the first rigid beam 240 is coupled to a first horizontal edge 212 of the first inertial mass 204 by a first spring structure 260 of the third spring system, and the other end of the first rigid beam 240 is coupled to a first horizontal edge 220 of the second inertial mass 206 by a second spring structure 262 of the third spring system. Correspondingly, one end of the second rigid beam 250 is coupled to a second horizontal edge 214 of the first inertial mass 204 by a third spring structure 264 of the third spring system 258, and the other end of the second rigid beam 250 is coupled to a second horizontal edge 222 of the second inertial mass 206 by a fourth spring structure 266 of the third spring system.

Each of the spring structures 260, 262, 264, 266 of the third spring system is configured to enable the oscillatory rotation of its coupled inertial mass about an axis that in the initial static state extends in the IP2 direction. This corresponds to the rotary oscillation of inertial mass 204, 206 in the IP1 sense mode. Each of the spring structures 260, 262, 264, 266 of the third spring system is also configured in the initial static state to flex between a point of connection to a rigid beam and a point of connection to a horizontal edge of an inertial mass both in the first in-plane direction IP1 and in the second in-plane direction IP2 such that the flexing enables motion of the point of connection to the inertial mass along a curve in the reference plane. FIGS. 5A and 5B illustrate in more detail the one possible form that enables the described spring function features of the third spring system in FIG. 2. Other functionally equivalent forms may be applied within the scope.

FIG. 5A illustrates the first spring structure 260 of the third spring system in the initial static state. It is noted that FIGS. 5A and 5B are schematic drawings simplified to describe how possible mechanical forms create the desired spring functions, they do not indicate any specific dimensions. A person skilled in the art is able to implement the disclosed spring characteristics with a variety of structural spring forms and dimensions. The first spring structure 260 of the third spring system has a point of connection 500 to the first rigid beam 240 and a point of connection 502 to the first inertial mass 204. Between the points of connection extend a first spring structure 260 that may be formed of a meandering spring where beam sections in the second in-plane direction IP2 are coupled in opposite ends in turns by shorter beam sections in the first in-plane direction IP1. Due to thickness of the device structure, beam sections and thus the whole spring structure 260 resists stiffly bending in the out-of-plane direction OP. At least the longer beam sections may bend in a direction normal to their length dimension.

Accordingly, as shown in FIG. 5B, bending of the longitudinal parts enables the first inertial mass 204 to undergo the rotational in-plane drive motion, the point of connection to the first rigid beam 240 maintains its position and the point of connection to the first inertial mass 204 move along a circular curve in the reference plane. On the other hand, as described earlier, angular rotation of the device about an axis in the first in-plane direction IP1 induces a Coriolis force that causes the inertial mass 204 to rotate about an axis that in the initial static state extends in the second in-plane direction IP2. This IP1 sense mode of motion is now facilitated by torsion of the first spring structure 260, and signals derived from such mode of motion are called as IP1 sense signals. In said IP1 sense mode, main portion of the torsion takes place in the first long beam section, which is coupled to the point of connection 502. However, part of the torsion upon the first beam section may become mediated to the next long beam section, and part of that to the next long beam section, so that all beam sections can be considered to facilitate the torsion. Axis of rotation in the IP1 sense mode runs through the point of connection 502 in the first horizontal edge 212 of the first inertial mass 204, and a point of connection in the second horizontal edge 214 of the first inertial mass 204. Rotation of the device about an axis in the second in-plane direction IP2 induces a Coriolis force that causes the inertial masses to rotate about a common axis that in the initial static state extends in the first in-plane direction IP1. This IP2 sense mode of motion is now facilitated by torsion of spring structures 244, 254 of the second spring system, and signals derived from such mode of motion are called as IP2 sense signals. As the meandering spring structure is rigid in the out-of-plane direction, in other words resists stiffly bending in the out-of-plane direction, the first spring structure 260 couples the first horizontal edge 212 of the first inertial mass 204 rigidly to the out-of-plane motion of the end of the first rigid beam 240.

As may be seen from FIG. 2, in the third spring system, the second spring structure 262 in the other end of the first rigid beam 240 is mirror symmetric to the first spring structure 260. In the balanced rotational in-plane drive motion, the inertial masses 204, 206 are enabled to rotate about their respective drive axes and forced by the spring structure 230 of the first spring system to oscillate in anti-phase. This means that the Coriolis-induced rotations occur also in anti-phase. Both the drive mode and the sense modes are thus well balanced. In the IP1 sense mode, the spring structure 230 of the first spring system couples the first vertical edges 208, 218 to move side by side such that the IP1 sense mode of the inertial masses 204, 206 is anti-phase rotation about two parallel axes in the IP2 direction. In the IP2 sense mode, the out-of-plane see-saw beam system couples rigidly the first horizontal edges 212, 220 to move in opposite directions, and thus enables anti-phase rotary oscillation of the inertial masses 204, 206 about a common axis in the IP1 direction.

In the IP1 sense mode, a random acceleration would try to move inertial masses in both inertial masses 204, 206 in the same phase. For that, the first vertical edge 208 should move to one out-of-plane direction and the first vertical edge 216 to the opposite direction. Such motion is, however, is disabled by out-of-plane stiffness of the spring structure 230 of the first spring system.

On the other hand, in the IP2 sense mode, a random acceleration would try to move both inertial masses 204, 206 in the same phase. For that, the first horizontal edges 212, 220 facing to the positive IP2 direction should move simultaneously in one out-of-plane direction, while second horizontal edges 214, 222 facing to the negative IP2 direction should move simultaneously in the other out-of-plane direction. However, the out-of-plane see-saw beam systems that are sturdily anchored to the support and rigid in the out-of-plane direction resist stiffly such common mode of motion.

Also, in the drive motion, a random acceleration would try to move both inertial masses 204, 206 in the same phase, i.e. so that inertial masses would be rotated from the initial position to the same clockwise or counterclockwise direction. This is, however, disabled because the first spring structure 230 is not able to warp into S-form between the inertial masses 204, 206.

The disclosed configuration thus facilitates the balanced drive motion mode and the balanced detection motion mode to sense angular rotation of the device about an axis in the first in-plane direction IP1, and in the second in-plane direction IP2, and at the same time stabilizes said drive and sense modes against external shocks. The anti-phase sense modes enable differential detection where the detected signal in one mode corresponds to a difference of signals generated from motions of the two inertial masses about the respective in-plane axes, as disclosed above. This effectively reduces measurement errors arising from effects of temporal changes in operating conditions (temperature, humidity, mechanical stress, EMC etc.).

FIG. 2 illustrates also an advantageous structure applicable to generate the anti-phase in-plane drive motion of the inertial systems. As shown in FIG. 2, each of the inertial masses 204, 206 may be coupled to a respective drive element 270, 290. Linear drive motion is typically more effectively induced than rotary drive motion, so the drive element may be configured to include a linear drive element and a transform drive element. In this first example, the linear drive element has been configured to undergo linear drive motion in one of the in-plane directions, and the transform drive element is coupled to the inertial mass and the linear drive element and configured to convert the linear drive motion of the linear drive element into rotational in-plane motion of the inertial mass about an axis in the out-of-plane direction. For balanced mass distribution, the inertial masses preferably have mirror symmetry, so the drive function of the drive elements is described in the following with reference to the drive element 270 of the first inertial mass 204. For a person skilled in the art, the implementation of the drive element 290 for the second inertial mass 206 is a straightforward task. In this example, the drive element 270 is disposed within the first inertial mass 204. Other examples will be discussed later on.

The drive element 270 for the first inertial mass 204 in FIG. 2 includes a linear drive element 271, and a transform drive element 272. The linear drive element 271 includes linear drive masses, coupled to the support through attachment points of a second attachment element and enabled to oscillate linearly by spring structures of a fourth spring system. The second attachment element is configured to provide a static coupling to the support for suspension of both drive elements 270, 290 of the inertial masses 204, 206. The linear drive element 271 of the drive element 270 of the first inertial mass 204 includes two linear drive masses 273, 274, which in this example are longitudinal beams, each extending in the second in-plane direction IP2. The fourth spring system is configured to couple the linear drive masses of both inertial masses 204, 206, to attachment points of the second attachment element and to enable linear anti-phase motions of the linear drive masses in the second in-plane direction IP2. For enhanced stabilization of a linear drive element 271, the second attachment element may include two pairs of attachment points, one pair 275, 276 for each linear drive mass. Correspondingly, for the linear drive element 271, the fourth spring system may include one spring structure for each attachment point of the second attachment element and a pair of spring structures couples one linear drive mass to the support. For example, a pair of spring structures 277, 278 of the fourth spring system may be disposed at opposite ends of the longitudinal beam of the linear drive mass 273, and each of the spring structures 277, 278 may be arranged to couple the respective end of the longitudinal beam to an attachment point 275, 276, as shown in FIG. 2. Similar arrangement may be provided for the linear drive mass 274.

In this example, the transform drive element 272 is disposed between the first linear drive mass 273 and the second linear drive mass 274. The transform drive element 272 includes a transform drive mass 279 that is coupled to the linear drive masses 273, 274 through springs of a fifth spring system, and to the first inertial mass 204 though springs of a sixth spring system. The fifth spring system is configured to couple motion of two linear drive masses to the intermediate transform drive mass 279 within drive elements of the inertial masses 204, 206 such that the motion of the transform drive mass is a sum of the motions of the linear drive masses. In FIG. 2, the transform drive mass 279 has two horizontal edges that extend mainly in the first in-plane direction IP1, and two vertical edges that extend mainly in the second in-plane direction IP2. A first spring structure 280 of the fifth spring system couples the first linear drive mass 273 to one vertical edge of the transform drive mass 279, and the second spring structure 281 of the fifth spring system couples the second linear drive mass 274 the opposite vertical edge of the transform drive mass 279. The spring structures 280, 281 of the fifth spring system advantageously resist stiffly displacement in the second in-plane direction IP2 and in the out-of-plane direction OP but flex torsionally about an axis in the first in-plane direction IP1. In the initial static state, this axis is aligned with the drive axis of the inertial mass 204. FIG. 2 shows an example where the spring structures 280, 281 of the fifth spring system include a short beam that extends in the first in-plane direction IP1, and a longitudinal recess that extends in the second in-plane direction IP2 in the near vicinity of the connection point of the beam to the respective inertial mass. The beam provides the described torsion and stability in the second in-plane and out-of-plane directions, and the recess enables necessary flexibility in the first in-plane direction IP1 between the linear motion of a linear drive mass and the rotational motion of the driven inertial mass.

Accordingly, the first linear drive mass 273 may now be equipped with a capacitive drive system (not shown) that drives the linear drive mass 273 to oscillate back and forth in the IP2 direction. Induction of oscillatory drive motion is well known for a person skilled in the art and will not be discussed in more detail herein. The second linear drive mass 274 may also be equipped with a capacitive drive system (not shown) that drives the linear drive mass to oscillate in the IP2 direction, but always in opposite direction (anti-phase) than the first linear drive mass 273. The anti-phase linear motions of the linear drive masses 273, 274 are relayed to the opposite vertical edges of the transform drive mass 279 by the spring structures 280, 281 of the fifth spring system, causing the transform drive mass 279 to oscillate in rotary motion about an axis in the OP direction.

The sturdily anchored linear drive motion taking place within the inertial mass is effective and at the same very accurate, thus reducing errors in measurement results.

The horizontal edges of the transform drive mass 279 are coupled to the inertial mass 204 by springs 282, 283 of the sixth spring system. The sixth spring system is configured to couple each of the inertial masses 204, 206 to its internal transform drive mass such that rotary oscillation of the internal transform drive mass is relayed to rotary oscillation of the surrounding inertial mass. In FIG. 2, a first spring structure 282 of the sixth spring system is coupled between one horizontal edge of the transform drive mass 279 and an internal horizontal edge of the first inertial mass 204 and is configured to flex torsionally about an axis that in the initial static state extends in the second in-plane direction IP2. Correspondingly, a second spring structure 283 of the sixth spring system is coupled between the other horizontal edge of the transform drive mass 279 and another internal horizontal edge of the first inertial mass 204 and is also configured to flex torsionally about an axis that in the initial static state extends in the second in-plane direction IP2. Advantageously, the spring structures 282, 283 of the sixth spring system 279 are co-linear and resist other types of deformations. As the spring structures 282, 283 do not bend in the in-plane directions, the in-plane rotation of each transform drive element is effectively relayed to the surrounding inertial mass, thus inducing the drive mode motion of the first inertial mass 204. The torsional flexibility provided by spring structures 282, 283 of the sixth spring system enables the inertial mass 204 to oscillate in the IP1 sense mode. The stiffness of the spring structures 282, 283 of the sixth spring system against bending in the out-of-plane direction OP couples the transform drive mass 279 to the rotational oscillation of the inertial mass 204 in the IP2 sense mode. This motion of the transform drive mass 279 is enabled by the torsional flexibility of spring structures 280, 281 of the fifth spring system.

The disclosed combination of springs defining modes of motion of drive masses and driven masses enables sensing of angular rates with high sensitivity and at the same time provides enhanced robustness against external shocks, by advantageously utilizing inherent mechanical properties of spring structures patterned from a same structure layer as inertial masses of the device.

The robustness of the device configuration may be enhanced by a central anchoring that further fastens the drive elements 270, 290 to the support and thus stabilizes the drive modes of motion. The central anchoring may be implemented with a third attachment element and a seventh spring system. The third attachment element is configured to provide a static coupling to the support for internal suspension of transform drive masses in internal drive elements of the inertial masses 204, 206. The seventh spring system is configured to suspend the transform drive masses in the internal drive elements of the inertial masses 204, 206 from the third attachment element. For example, as shown in the example of FIG. 2, an attachment point 285 of the third attachment element may be fastened to the support, and the transform drive mass 279 may be coupled to the attachment point 285 by a spring structure 286 of the seventh spring system. The spring structure 286 may be configured to bend in the second in-plane direction IP2 and flex torsionally about an axis in the first in-plane direction IP1. The attachment point 285 and the spring structure 286 are disposed within the transform drive mass 279, so that in the initial static state, the axis of rotation of the transform drive mass 279 is aligned to the first sense axis, in other words axis of rotation of the first inertial mass 204 in the IP2 sense mode of motion. Advantageously, the spring structure 286 of the seventh spring system resists deformations caused by other modes of motion of the transform drive mass 279. In the example of FIG. 2, the spring structure 286 is implemented with a beam that couples the transform drive mass 279 and the attachment point 285. The in-plane bending of the spring structure 286 in a central location of the transform drive mass 279 enables the in-plane rotation of the rotational drive mass in the drive mode of motion. The stiffness of the spring structure 286 against bending in the out-of-plane direction effectively eliminates possible parasitic vibrations in the drive and IP1 sense modes. The torsional flexibility of the spring structure 286 enables the direct coupling between the out-of-plane see-saw motion of the transform drive mass 279 and the first inertial mass 204 in the IP2 sense mode.

As discussed earlier, the disclosed structure is symmetric, so a description for the drive element 290 of the inertial mass 206 of the second inertial mass system 202 can be easily derived from the description of the drive element 270 provided herein.

Figure 6:
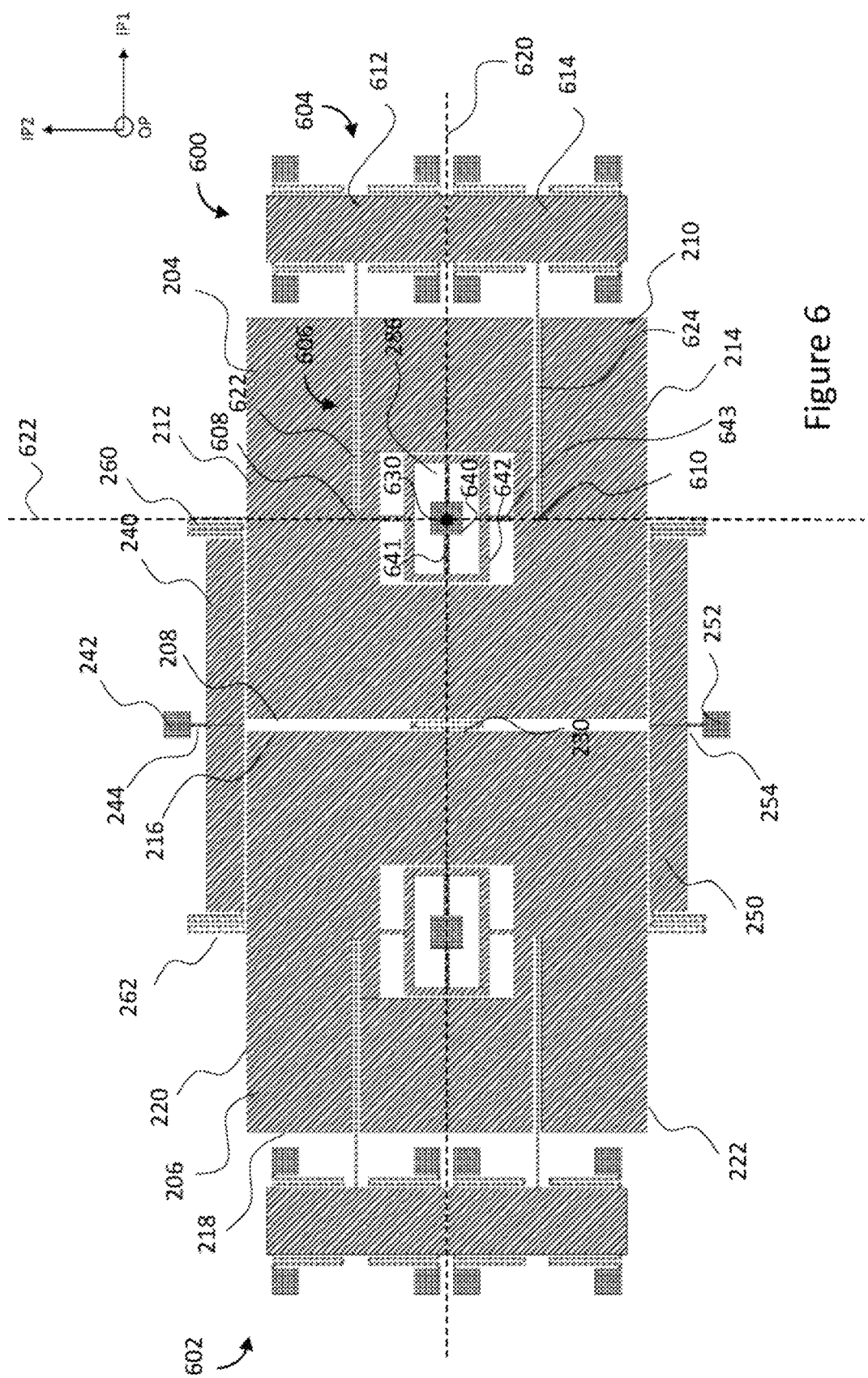
FIG. 6 illustrates an alternative example for the disclosed device.

FIG. 6 illustrates an alternative example for the disclosed device. Elements already described with FIG. 2 have been denoted with same reference numbers. As may be noted, FIG. 6 illustrates an alternative form for the inertial masses, in which form the inertial masses can occupy more of the available surface area of the device and thus provide increased inertial mass for the drive and sense motions. Accordingly, in this embodiment, the horizontal and vertical edges of the inertial masses are straight with no indentations, and thus parts of the first attachment element and parts of the second spring system are disposed outwards from the first beam 240 of the out-of-plane see-saw beam system. Furthermore, the fully internal drive elements 270, 290 of FIG. 2 have now been replaced by partly external drive elements 600, 602 that correspondingly induce the anti-phase in-plane drive modes of motion of the inertial masses 204, 206, disclosed with FIG. 2. In the example of FIG. 6, each drive element includes again a linear drive element and a transform drive element, but now each of the linear drive elements is disposed outside its respective inertial mass.

In the following, the detailed description is provided with reference to the drive element 600 of the first inertial mass 204. Disclosure for implementation of the drive element 602 of the 600 inertial mass 206 can be easily derived from the same description. As in FIG. 2, the drive element 600 of the first inertial mass 204 in FIG. 6 includes a linear drive element 604 and a transform drive element 606. However, now the linear drive element 604 is suspended from the support in a position outside the first inertial mass 204, and the transform drive element 606 couples the linear drive element 604 to two coupling points 608, 610 in the first inertial mass 204.

The linear drive element 604 includes a first linear drive mass 612 and a second linear drive mass 614. As in FIG. 2, these linear drive masses 612, 614 can be suspended from attachment points of the second attachment element with directional springs of a fourth spring system that couples the linear drive masses 612, 614 to attachment points of the second attachment element in a way that enables linear motions of the linear drive masses 612, 614. However, contrary to the configuration of FIG. 2, the directional springs are configured to enable the linear motions of the linear drive masses 612, 614 in the first in-plane direction IP1, and the attachment points of the second attachment element are not within the first inertial mass, but outside of it.

The first inertial mass 204 has a center of rotation 630 at a point where the drive axes, meaning the axis of rotation of the rotational in-plane motion of the first inertial mass 204 crosses the reference plane. In this example, the linear motion of two linear drive masses 612, 614 is transformed into rotary motion of the first inertial mass 204 by relaying the anti-phase oscillation of the linear drive masses directly to two internal points of the first inertial mass 204. The two internal points are located essentially in a line that crosses the center of rotation 630 in the second in-plane direction IP2, on opposite sides of the center of rotation. The term essentially implies here that due to the internal material strains and relationships between different dimensions in the in-plane and out-of-plane directions, a line connecting openings in the first inertial mass 204 for the coupling points may be slightly offset from the line that connects the internal material zero strain points about which rotation about the IP2 directional axis in IP1 sense mode occurs. In functional terms, the essential co-linearity of the coupling points and the center point means that the coupling points 608, 610 extend deep enough into the first inertial mass 204 so that rotation of the inertial mass in the IP1 sense mode is enabled.

Accordingly, FIG. 6 shows an example, where the transform drive element 606 includes two longitudinal beams 622, 624. A first beam 622 of the transform drive element 606 extends from a first linear drive mass 612 to a first coupling point 608 within the first inertial mass 204. A second beam 624 of the transform drive element 606 extends from a second linear drive mass 614 to a second coupling point 610 within the first inertial mass 204. When the linear drive masses 612, 614 are driven in antiphase, the beams 622,624 relay the linear motion to the internal points 608, 610 within the first inertial mass 204, and thereby induce linear pushes and pulls to induce the rotary drive motion.

Robustness of the device structure may again be further enhanced with the central anchoring. In FIG. 6, a first rotation axis 620 in the IP1 direction illustrates the initially common axis of rotation for the IP2 sense mode. A second rotation axis 622 in the IP2 direction illustrates the initial rotary axis of the first inertial mass 204 for the IP1 sense mode. The central anchoring is implemented with an attachment point of a fourth attachment element, already disclosed to provide a static coupling for central suspension of the inertial masses 204, 206 from the support, and a spring structure of an eighth spring system. In FIG. 6, an attachment point 640 of the fourth attachment element for the first inertial mass 204 is shown to coincide with the center of rotation 630 of the first inertial mass 204. The spring structure of the eighth spring system includes a first coupling spring structure 641, a frame 642 and a second coupling spring structure 643. The frame 642 represents here a structural element that forms a rigid, at least partially enclosing border around an open space within it. The frame 642 is coupled to the attachment point 640 through the first coupling spring structure 641 and to the first inertial mass 204 through the second coupling spring structure 643. One or both of the coupling spring structures 641, 643 may bend flexibly in the respective in-plane direction so that the in-plane rotation of the first inertial mass 204 is enabled. The first coupling spring structure 641 has been further configured to twist flexibly between the attachment point 640 and the frame 642 about an axis that in the initial static state extends in the first in-plane direction IP1.

In FIG. 6, the first coupling spring structure 641 includes two parts that project to opposite sides in the first in-plane direction IP1 and extend into inner edges of the frame 642. The second coupling spring structure 643 may be further configured to twist flexibly between the first inertial mass 204 and the frame 642 about an axis in the second in-plane direction IP2. In FIG. 6, the second coupling spring structure 643 includes two parts that project to opposite sides in the second in-plane direction IP2 and extend into inner horizontal edges of the first inertial mass 204. This combination of coupling spring structures 641, 643 and the frame 642 enable the IP1 sense mode of motion and the IP2 sense mode of motion. The first coupling spring structure 641 is not able to bend in the out-of-plane direction and neither is the frame 642. The second coupling spring structure 643 is able to twist between the frame 642 and the first inertial mass when the first inertial mass 204 rotates about second rotation axis 622 in the IP1 sense mode. Similarly, the second coupling spring structure 643 is not able to bend in the out-of-plane direction and neither is the frame 642. The first coupling spring structure 641 is able to twist between the frame 642 and the attachment point 640 when the first inertial mass 204 rotates about the first rotation axis 620 in the IP2 sense mode.

Figure 7:
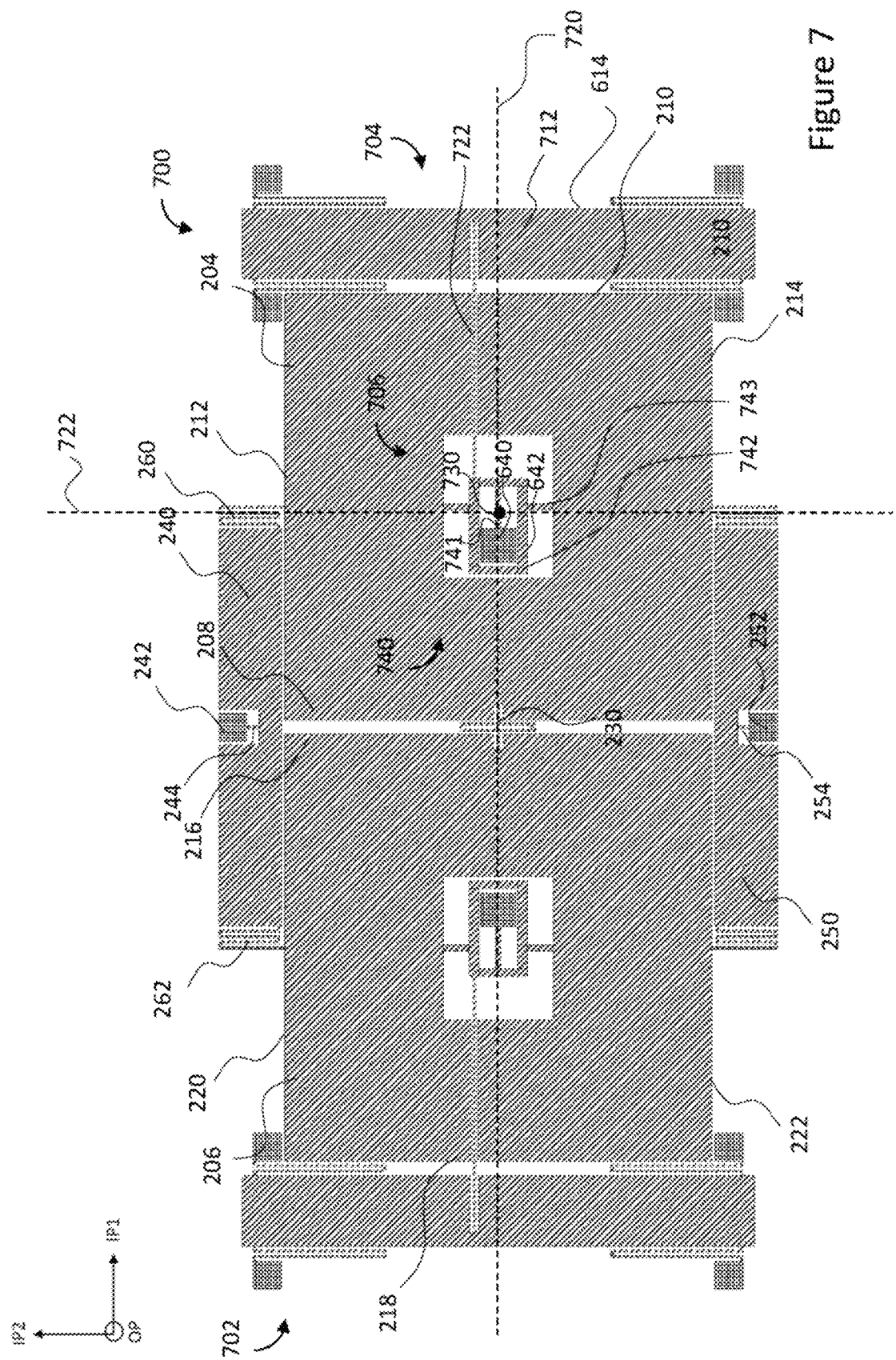
FIG. 7 illustrates another alternative example for the disclosed device.

FIG. 7 illustrates a further alternative example for the disclosed device. Elements already described with FIG. 2 have again been denoted with same reference numbers. As in FIG. 6, the fully internal drive elements 270, 290 of FIG. 2 have been replaced by partly external drive elements 700, 702 that correspondingly induce the anti-phase in-plane drive modes of motion of the inertial masses 204, 206, disclosed with FIG. 2. In the example of FIG. 7, each drive element includes again a linear drive element and a transform drive element, and each of the linear drive elements is disposed outside its respective inertial mass.

In the following, the detailed description is provided with reference to the drive element 700 of the first inertial mass 204. Disclosure for implementation of the drive element 702 of the second inertial mass 206 can be easily derived from the same description. As in FIGS. 2 and 6, the drive element 700 of the first inertial mass 204 in FIG. 7 includes a linear drive element 704 and a transform drive element 706. However, as in FIG. 6, the linear drive element 704 is suspended from the support in a position outside the first inertial mass 204. Furthermore, the transform drive element 706 also provides the central anchoring that is disclosed as a separate element for the first inertial mass 204 in the configuration of FIG. 6.

The linear drive element 704 includes one linear drive mass 712. As in FIGS. 2 and 6, directional springs of the fourth spring system are configured to couple the linear drive mass 712 to attachment points of the second attachment element and to enable linear motion of the linear drive mass 712. In the configuration of FIG. 7, the directional springs are configured to enable the linear motions of the linear drive mass 712 in the first in-plane direction IP1. The linear motion of the linear drive mass 712 is transformed into rotary motion of the first inertial mass 204 by relaying the oscillation of the drive mass 712 asymmetrically to a central spring structure located within the first inertial mass 204.

The first inertial mass 204 has a center of rotation 730 at a point where the axis of rotation of the rotational in-plane motion of the first inertial mass 204 (drive axis) crosses the reference plane. In FIG. 7, a first rotation axis 720 in the IP1 direction illustrates the common axis of rotation during the IP2 sense mode. A second rotation axis 722 in the IP2 direction illustrates the rotary axis of the first inertial mass 204 in the IP1 sense mode. As in FIG. 6, central anchoring for the first inertial mass 204 is implemented with an attachment point 640 of a fourth attachment element, configured to provide a static coupling for central suspension of the inertial masses 204, 206 from the support.

The first inertial mass 204 is coupled to the attachment point 640 through a spring structure 740 of a ninth spring system. The spring structure 740 of the ninth spring system for the first inertial mass 204 includes a first coupling spring structure 741, a frame 742 and a second coupling spring structure 743. The frame 742 is coupled to the attachment point 640 through the first coupling spring structure 741 and to the first inertial mass 204 through the second coupling spring structure 743. The first coupling spring structure 741 is configured to bend flexibly in the second in-plane direction to enable the in-plane rotation of the first inertial mass 204. The first coupling spring structure 741 is further configured to twist flexibly between the attachment point 740 and the frame 742 about a spring axis that in the initial static state extends in the first in-plane direction IP1. The center of rotation 730 is offset from the attachment point 640 and located at some point in the spring axis of the first coupling spring structure 741. The first coupling spring structure 741 is, however, stiff in the out-of-plane direction OP, as is the frame 742.

The second coupling spring structure 743 is configured to twist flexibly between the first inertial mass 204 and the frame 742 about an axis in the second in-plane direction IP2. In FIG. 7, the second coupling spring structure 743 includes two parts that project to opposite sides in the second in-plane direction IP2 and extend into inner horizontal edges of the first inertial mass 204.

Accordingly, the described structural combination configures the first coupling spring structure 741 to twist between the frame 742 and the attachment point 640 when the first inertial mass 204 rotates about the first rotation axis 720 in the IP2 sense mode. On the other hand, the second coupling spring structure 743 is able to twist between the frame 742 and the first inertial mass 204 when the first inertial mass 204 rotates about a second rotation axis 722 in the IP1 sense mode. The second coupling spring structure 743 does not bend in the in-of-plane directions and neither does the frame 742, so that motions induced to the frame are relayed directly to the first inertial mass 204.

In this example, the linear motion of the linear drive mass 712 is transformed into rotary motion of the first inertial mass 204 by relaying the oscillation of the drive masses asymmetrically to the frame 742. For this, the transform drive element 706 includes a longitudinal beam 722 that extends in the first in-plane direction IP1 from the linear drive mass 712 to a coupling point in the frame. Advantageously the beam 722 is patterned into the same structure material layer with the first inertial mass 204 so that the beam and the first rotation axis 720 are coplanar but separated by a non-zero distance. In operation this means that when the linear motion of the linear drive mass 712 in the positive IP1 direction tries to pull the frame 742, the combination of the attachment point 640 and the first coupling spring structure transform the pulling force into a clock-wise rotary motion of the frame 742 about the center of rotation 730. Correspondingly, pulling force from the linear motion of the linear drive mass 712 in the negative IP1 is transformed into a counter-clock-wise rotary motion of the frame 742. The second coupling spring structure 743 relays this rotary motion of the frame 742 directly to rotary oscillation of the first inertial mass 204.

Figure 8:
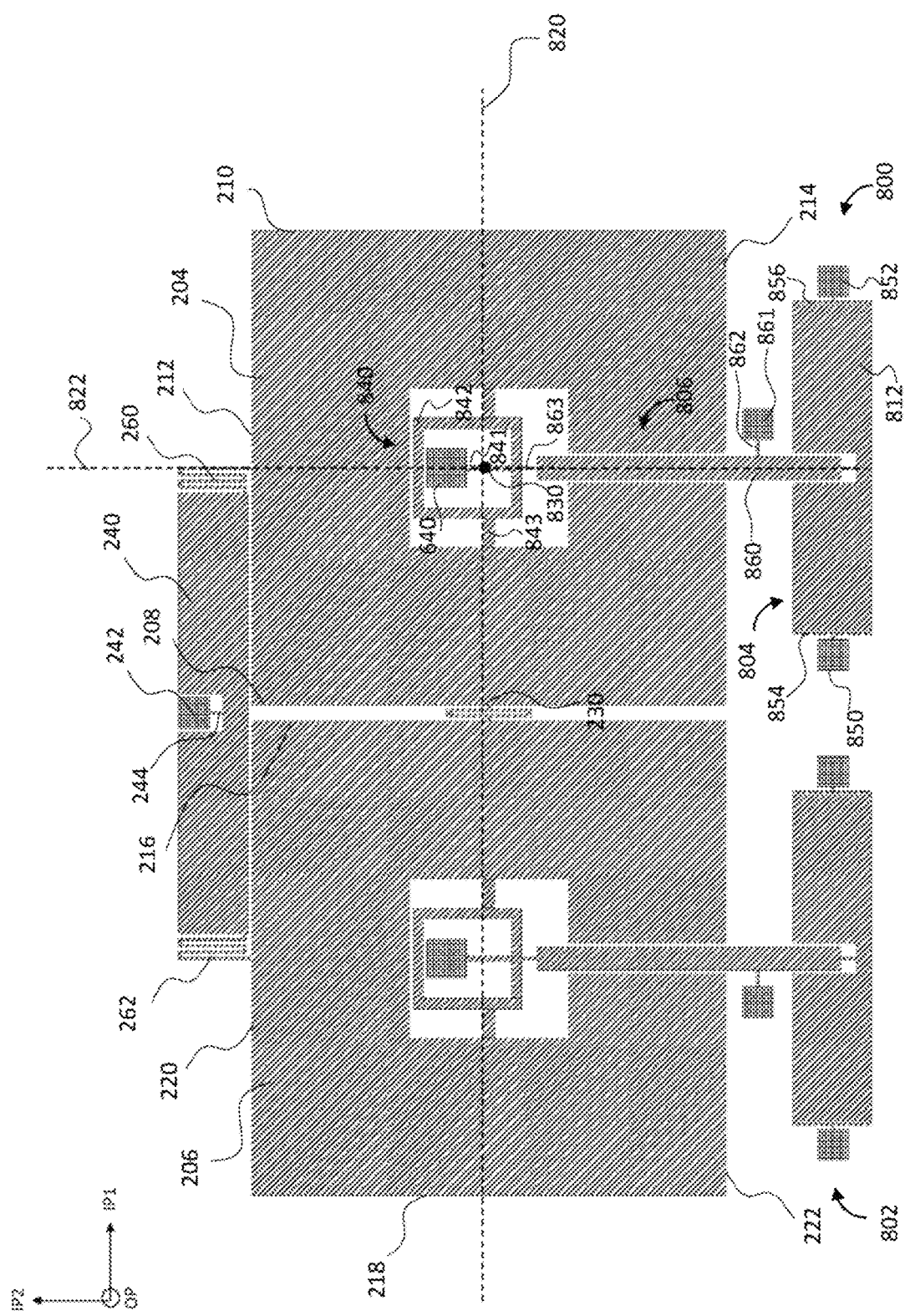
FIG. 8 illustrates a further alternative example for the disclosed device.

FIG. 8 illustrates a further alternative example for the disclosed device. Elements already described with FIG. 2 have again been denoted with same reference numbers. As in FIGS. 6 and 7, the fully internal drive elements 270, 290 of FIG. 2 have been replaced by partly external drive elements 800, 802 that correspondingly induce the anti-phase in-plane drive modes of motion of the inertial masses 204, 206, disclosed with FIG. 2. In the example of FIG. 8, each drive element 800, 802 includes again a linear drive element and a transform drive element, and each of the linear drive elements is disposed outside its respective inertial mass.

In this example, the dimension of the device structure in the IP1 direction has been reduced by arranging the drive elements 800, 802 to a position of one of the out-of-plane see-saw beam systems 250 of the earlier examples. Accordingly, along the second in-plane direction IP2, the drive motion is induced by drive elements on one side of the inertial masses 204, 206 and the stabilizing coupling by the out-of-plane see-saw beam system on the other side of the inertial masses 204, 206.

In the following, the detailed description is provided with reference to the drive element 800 of the first inertial mass 204. Disclosure for implementation of the drive element 802 of the second inertial mass 206 can be easily derived from the same description. As in FIGS. 2, 6 and 7, the drive element 800 of the first inertial mass 204 in FIG. 7 includes a linear drive element 804 and a transform drive element 806. The linear drive element 804 is suspended from the support in a position outside the first inertial mass 204, and the transform drive element 806 also provides central anchoring for the vibratory motions.

The linear drive element 802 includes one linear drive mass 812 that can be suspended from attachment points 850, 852 of the second attachment element with directional springs 854, 856 of a fourth spring system that is configured to enable linear motion of the linear drive mass 812. In the configuration of FIG. 8, the directional springs 854, 856 are configured to enable the linear motion of the linear drive mass 812 in the first in-plane direction IP1. The linear motion of the linear drive mass 812 is transformed into rotary motion of the first inertial mass 204 by an in-plane see-saw beam system included in the transform drive element.

The first inertial mass 204 has a center of rotation 830 at a point where the axis of rotation of the rotational in-plane motion of the first inertial mass 204 crosses the reference plane. In FIG. 8, a first rotation axis 820 in the IP1 direction illustrates the common axis of rotation during the IP2 sense mode. A second rotation axis 822 in the IP2 direction illustrates the rotary axis of the first inertial mass 204 in the IP1 sense mode. As in FIG. 6, central anchoring for the first inertial mass 204 is implemented with an attachment point 640 of a fourth attachment element, which is configured to provide a static coupling for central suspension of the inertial masses 204, 206 from the support.

The first inertial mass 204 is coupled to the attachment point 640 through a spring structure 840 of a tenth spring system. The spring structure 840 of the tenth spring system for the first inertial mass 204 includes a first coupling spring structure 841, a frame 842 and a second coupling spring structure 843. The frame 842 is coupled to the attachment point 640 through the first coupling spring structure 841 and to the first inertial mass 204 through the second coupling spring structure 843. The first coupling spring structure 841 is configured to bend flexibly in the first in-plane direction IP1 to enable the in-plane rotation of the first inertial mass 204. The first coupling spring structure 841 is further configured to twist flexibly between the attachment point 640 and the frame 842 about a spring axis in the second in-plane direction IP2. The center of rotation 830 is offset from the attachment point 640 and located at some point in the spring axis of the first coupling spring structure 841. The first coupling spring structure 841 is, however, stiff in the out-of-plane direction OP, as is the frame 842.

The second coupling spring structure 843 is configured to twist flexibly between the first inertial mass 204 and the frame 842 about an axis in the first in-plane direction IP1. In FIG. 8, the second coupling spring structure 843 includes two parts that project to opposite sides in the first in-plane direction IP1 and extend into inner vertical edges of the first inertial mass 204.

Accordingly, the described structural combination configures the first coupling spring structure 841 to twist between the frame 842 and attachment point 640 when the first inertial mass 204 rotates about the second rotation axis 822 in the IP1 sense mode. On the other hand, the second coupling spring structure 843 is able to twist between the frame 842 and the first inertial mass 204 when the first inertial mass 204 rotates about a first rotation axis 820 in the IP2 sense mode. The second coupling spring structure 843 does not bend in the in-of-plane directions and neither does the frame 842, so that motions induced to the frame are relayed directly to the first inertial mass 204.

In this example, the linear motion of the linear drive mass 812 is transformed into rotary motion of the first inertial mass 204 by coupling the linear oscillation of the linear drive mass 812 to one end of a beam of an in-plane see-saw beam system and coupling the other end of the beam to the frame 842. The mainly IP1 directional motion in the end of the beam that couples to the frame 842 is relayed to the frame, but the coupling to the attachment point 640 forces the frame 842 to rotary motion that is relayed to the first inertial mass 204 through the second coupling spring structure 843.

Accordingly, in this example, a transform drive element in a drive element of each of the inertial masses 204, 206 includes an in-plane see-saw beam system. The in-plane see-saw systems are coupled to the support through attachment points of a fifth attachment element. In the in-plane see-saw system for the inertial mass 204, a rigid beam 860 is coupled to an attachment point 861 of the fifth attachment element through a spring structure of an eleventh spring system. The eleventh spring system is configured to stabilise the fulcrum of the see-saw motion of the beam 860 to a locally static point. For this, the spring structure 862 of FIG. 8 connects to the beam 860 with a smaller region than the attachment point 861 would so that the in-plane see-saw motion of the beam 860 is enabled. Ends of the beam 860 couple to the linear drive mass 812 and to the frame through a spring structure 863 of a twelfth spring system. The profile of the spring structure 863 in the first in-plane direction IP1 is thinner than the profile of the beam 860. In a part of the spring structure 863 in the end of the linear drive mass 812 this couples the linear drive motion to the in-plane see-saw motion. In a part of the spring structure 863 in the end of the frame 842, the thinner profile enables twisting of the spring structure 863 between the end of the beam 860 and the frame about an axis in the second in-plane direction IP2 in the IP1 sense mode.

In operation this combination of elements works so that when the linear drive mass 812 moves in the positive IP1 direction, it pulls one end of the beam 860 to the same direction, whereby the other end of the beam moves the frame 842 to the opposite direction. The combination of the attachment point 640 and the first coupling spring structure 841 transform the pulling force into a clock-wise rotary motion of the frame 842 about the center of rotation 830. Correspondingly, pulling force from the linear motion of the linear drive mass 812 in the negative IP1 direction is transformed into a counter-clock-wise rotary motion of the frame 842. The second coupling spring structure 843 relays this rotary motion of the frame 842 directly to rotary oscillation of the first inertial mass 204.

Figure 9:
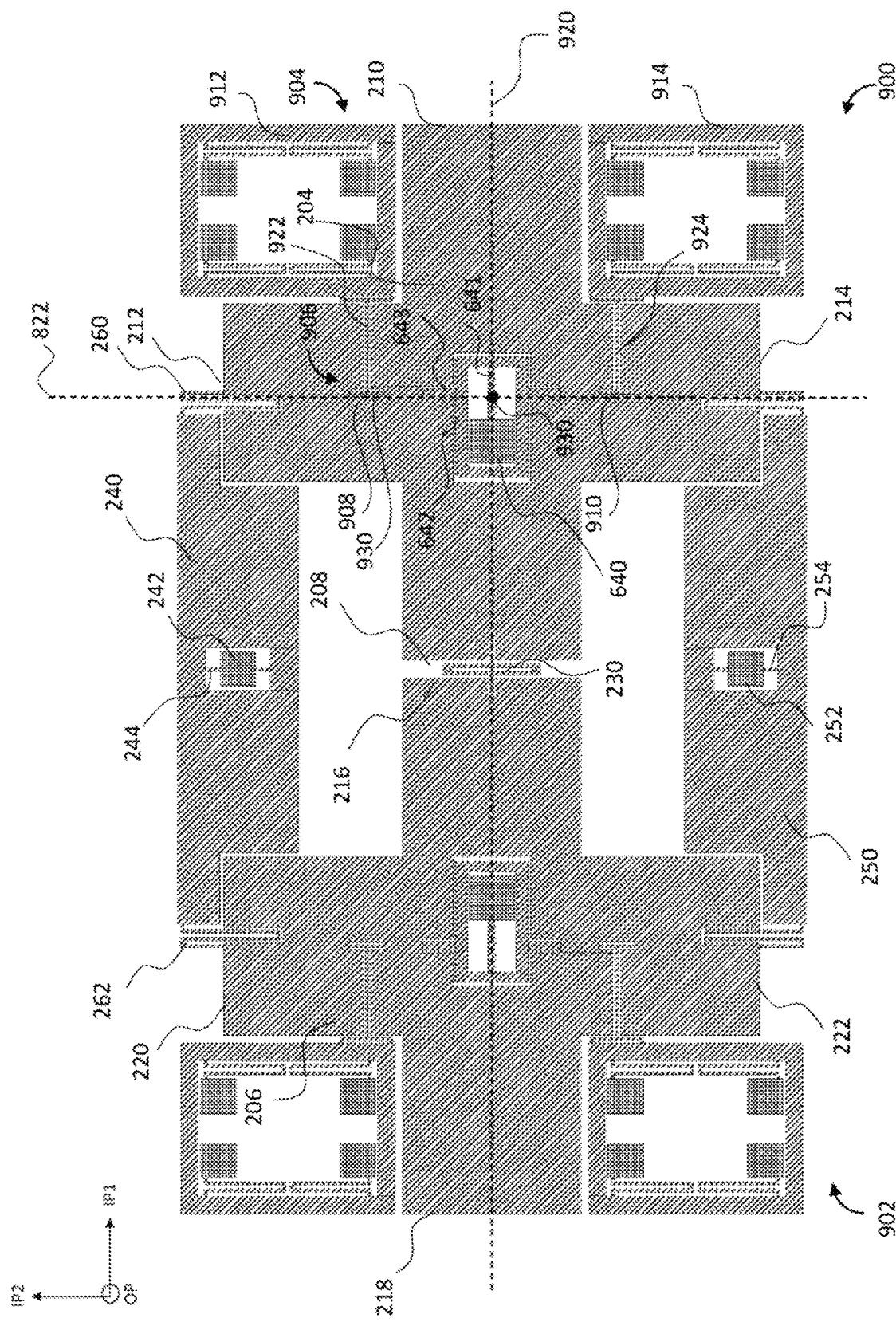
FIG. 9 illustrates a further alternative example for the disclosed device.

FIG. 9 illustrates a further alternative example for the disclosed device. Elements already described with FIG. 2 have again been denoted with same reference numbers.

As in FIGS. 6, 7 and 8, the fully internal drive elements 270, 290 of FIG. 2 have been replaced by partly external drive elements 900, 902 that correspondingly induce the anti-phase in-plane drive modes of motion of the inertial masses 204, 206, disclosed with FIG. 2. In the example of FIG. 9, each drive element 900, 902 includes again a linear drive element and a transform drive element. In this example, the inertial masses have a cross shape wherein a first bar form extends in the first in-plane direction IP1 and the second bar form extends in the second in-plane direction IP2, wherein the horizontal edges 212, 214 of the inertial mass 204 are provided by ends of the second bar form, and the vertical edges 208, 210 are provided by ends of the first bar form, as shown in FIG. 9. FIG. 9 shows also an alternative implementation for the spring structure 244 of the second spring system. As the cross shape of the inertial masses 204, 206 leaves some open space between them, the attachment points 242, 252 of the first attachment element can be positioned inside each respective rigid beam 240, 250. The spring structures 244, 254 can be correspondingly configured to be formed of two parts, each projecting from different sides of its attachment point to the respective rigid beam.

In the following, the detailed description is provided with reference to the drive element 900 of the first inertial mass 204. Disclosure for implementation of the drive element 902 of the second inertial mass 206 can be easily derived from the same description. As in FIGS. 2, 6, 7 and 8, the drive element 900 of the first inertial mass 204 in FIG. 9 includes a linear drive element 904 and a transform drive element 906. The linear drive element 904 is suspended from the support in a position, provided by a region between neighbouring perpendicular sides of bar forms of the cross-shaped first inertial mass 204, as shown in FIG. 9.

The linear drive element 904 includes a first linear drive mass 912 and a second linear drive mass 914. The linear drive masses 912, 914 can be suspended from attachment points of the second attachment element with directional spring structures of the fourth spring system that enables linear in-plane motions, in this example in the first in-plane direction IP1.

The first inertial mass 204 has a center of rotation 930 at a point where the axis of rotation of the rotational in-plane motion of the first inertial mass 204 crosses the reference plane. As in FIG. 6, the linear motion of the two linear drive masses 912, 914 is transformed into rotary motion of the first inertial mass 204 by relaying the anti-phase oscillation of the drive masses to two internal points that are located essentially in a line that crosses the center of rotation 930 in the second in-plane direction IP2, on opposite sides of the center of rotation.

Accordingly, FIG. 9 shows an example, where the transform drive element 906 includes two longitudinal beams. A first beam 922 of the transform drive element 906 extends from a first linear drive mass 912 to a first coupling point 908 within the first inertial mass 204. A second beam 924 of the transform drive element 906 extends from the second linear drive mass 914 to a second coupling point 910 within the first inertial mass 204. Advantageously the beams 922, 924 are patterned into the same structure material layer with the first inertial mass 204.

It may be seen that due to the cross-shape of the first inertial mass 204, the beam 922 is shorter that the beam 622 in FIG. 2. In order to avoid material strains in IP1 sense mode of motion due to this, the coupling point 908 to the first inertial mass 204 can be implemented to include a torsional part 930 that twists about an axis in the second in-plane direction IP2 when the first inertial mass 204 rotates about the second axis of rotation 922. Furthermore, the beam 922 can include a fork-like extension that couples to the linear drive mass 912. This fork-like extension enables the coupling point 908 to move in the out-of-plane direction with respective to the linear drive mass 912 when the first inertial mass 204 rotates about the first rotation axis 920 in the IP2 sense mode.

In FIG. 9, robustness of the configuration has been enhanced by a separate central anchoring that enables all modes of motion, as in FIG. 6. In FIG. 9, a first rotation axis 920 in the IP1 direction illustrates the initially common axis of rotation for the IP2 sense mode. A second rotation axis 922 in the IP2 direction illustrates the initial rotary axis of the first inertial mass 204 for the IP1 sense mode. The central anchoring is implemented with an attachment point of a fourth attachment element, already disclosed to provide a static coupling for central suspension of the inertial masses 204, 206 from the support, and a spring structure of an eighth spring system. However, as shown in FIG. 9, the attachment point 640 of the fourth attachment element for the first inertial mass 204 does not coincide with the center of rotation 930 of the first inertial mass 204. As outlined with FIG. 6, the spring structure of the eighth spring system includes a first coupling spring structure 641, a frame 642 and a second coupling spring structure 643. The frame 642 is coupled to the attachment point 640 through the first coupling spring structure 641 and to the first inertial mass 204 through the second coupling spring structure 643. This example shows an alternative implementation for the first coupling spring structure 641, wherein one spring beam couples the frame 642 to the attachment point 640.The first coupling spring structure 641 is configured to bend flexibly in the respective in-plane direction so that the in-plane rotation of the first inertial mass 204 is enabled. The first coupling spring structure 641 has been further configured to twist flexibly between the attachment point 640 and the frame 642 about an axis that in the initial static state extends in the first in-plane direction IP1.

The second coupling spring structure 643 may be configured to twist flexibly between the first inertial mass 204 and the frame 642 about an axis in the second in-plane direction IP2. In FIG. 9, the second coupling spring structure 643 again includes two parts that project to opposite sides in the second in-plane direction IP2 and extend into inner coupling points within the first inertial mass 204. This combination of coupling spring structures 641, 643 and the frame 642 enable the IP1 sense mode of motion and the IP2 sense mode of motion, as discussed with FIG. 6.

The central anchoring is implemented with an attachment point of a fourth attachment element and a spring structure of an eighth spring system. This example shows an alternative implementation for the first coupling spring structure 641, wherein one spring beam couples the frame 642 to the attachment point 640.

Figure 10:
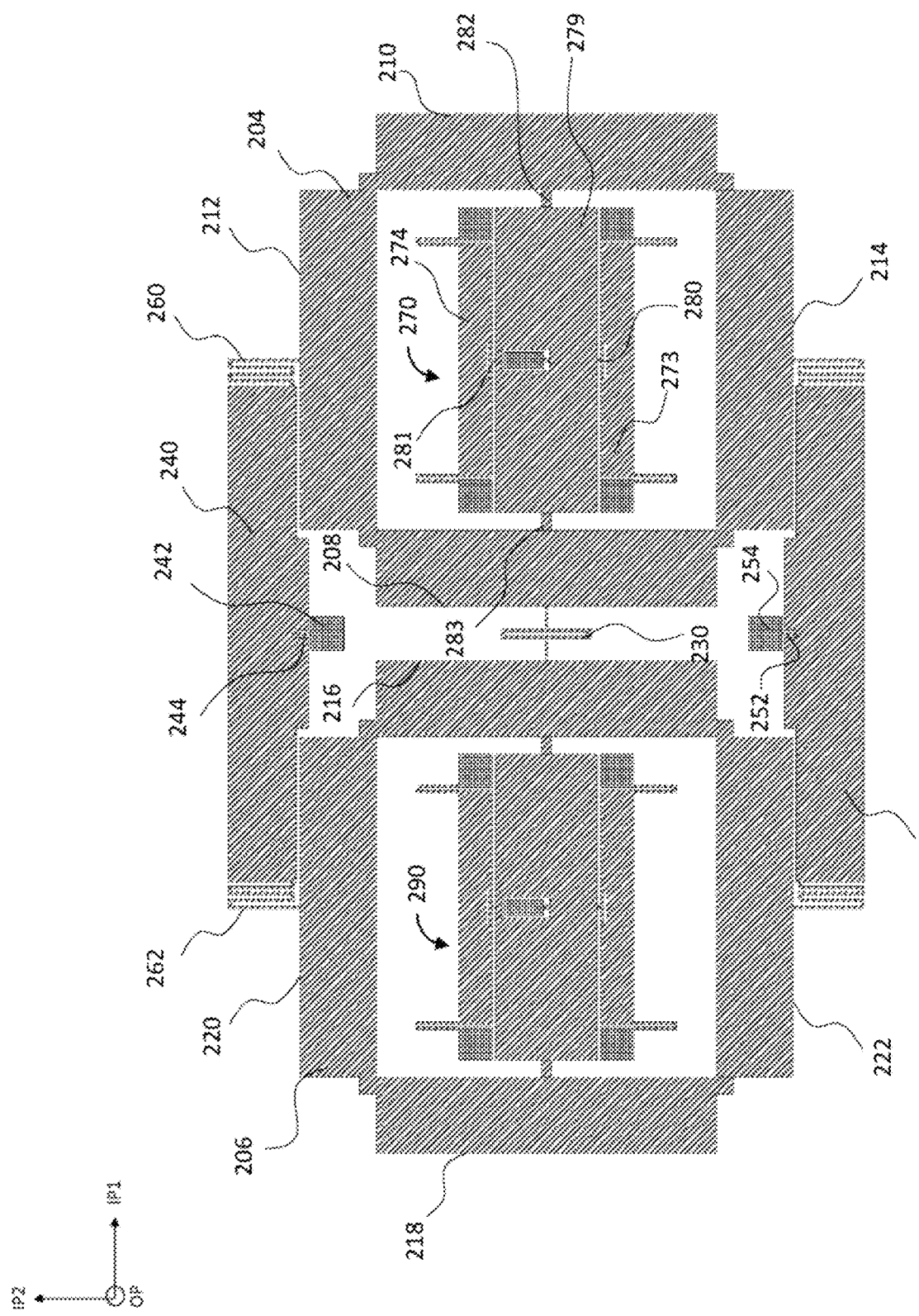
FIG. 10 illustrates a further alternative example for the disclosed device.

FIG. 10 illustrates a further alternative example for the disclosed device. Elements already described with FIG. 2 have again been denoted with same reference numbers. The configuration is otherwise as the one for FIG. 2, but the orientation of the drive elements 270, 290 is 90 degrees rotated from the orientation of the drive elements of FIG. 2. This orientation provides the same advantages achieved through the balanced combination of elements in the embodiment of FIG. 2 but provides some further advantageous design possibilities.

As described earlier, in the structure of FIG. 2, anti-phase linear drive motions of the linear drive masses 273, 274 are relayed to the opposite vertical edges of the transform drive mass 279 by the spring structures 280, 281 of the fifth spring system, causing the transform drive mass 279 to oscillate in rotary motion about an axis in the OP direction. The torsional flexibility provided by spring structures 282, 283 of the sixth spring system enables the first inertial mass 204 to oscillate in the IP1 sense mode about an axis in the IP2 direction. On the other hand, the stiffness of the spring structures 282, 283 of the sixth spring system against bending in the out-of-plane direction OP couples the transform drive mass 279 in the IP2 sense mode to the rotational oscillation of the first inertial mass 204 about an axis in the IP1 direction. The see-saw motion of the transform drive mass 279 is further enabled by the torsional flexibility of the spring structures 280, 281 of the fifth spring system.

This means that in the IP1 sense mode of FIG. 2, the transform drive mass 279 does not participate to the rotary oscillation of the first inertial mass 204. On the other hand, in the IP1 sense mode of FIG. 10, the rotary oscillation of the first inertial mass 204 is enabled by the spring structures 280, 281 of the fifth spring system, and the spring structures 282, 283 of the sixth spring system couple the transform drive mass 279 to oscillate with the first inertial mass 204. This means that electrodes of capacitive sensing in the IP1 sense mode may be alternatively arranged to the transform drive mass 279 instead of the first inertial mass 204. Capacitive sensing can then be implemented with static counter electrodes disposed above or underneath the electrodes in the out-of-plane direction OP. The arrangement optimally minimizes cross-channel sensitivity.

For fully balanced and symmetrical operation, electrodes of capacitive sensing in the IP2 sense mode may be arranged to the rigid beams 240, 250. In the IP2 sense mode of FIG. 2, the transform drive mass 279 is part of the rotary oscillation of the first inertial mass 204. On the other hand, in the IP2 sense mode of FIG. 10, the rotary oscillation of the first inertial mass 204 is enabled by the torsional flexibility of the spring structures 282, 283 of the sixth spring system, and out-of-plane stiffness of the spring structures 280, 281 of the fifth spring system and of the spring structures 277, 278 of the fourth spring system disables participation of the transform drive mass 279 to the rotary oscillation of the first inertial mass 204.

The invention claimed is:
1. An electromechanical device including a support;
a planar device structure that is coupled to the support; wherein
in an initial static state of the electromechanical device, the planar device structure forms a reference plane;
a first in-plane direction and a second in-plane direction are parallel to the reference plane and orthogonal with respect to each other;
an out-of-plane direction is normal to the reference plane;
the device structure includes two inertial masses, a first spring system and an out-of-plane see-saw beam system;
the two inertial masses extend along the reference plane;

each inertial mass has at least two horizontal edges that extend in the first in-plane direction, and at least two vertical edges that extend in the second in-plane direction;

adjacent vertical edges of the inertial masses of the two inertial mass systems are coupled to each other by a spring structure of the first spring system;

the first spring system is configured to bend flexibly between the inertial masses in the second in-plane direction and to twist flexibly between the inertial mass systems about a spring axis that is parallel to the first in-plane direction;

a horizontal edge of one of the two inertial masses facing one direction in the second in-plane direction is coupled to one end of a beam of the out-of-plane see-saw beam system and a horizontal edge of the other one of the two inertial masses facing the same direction in the second in-plane direction is coupled to the opposite end of the beam of the out-of-plane see-saw beam system wherein the beam is configured to rotate about an axis that is in the reference plane and parallel to the second in-plane direction;

each inertial mass is configured to be driven into anti-phase rotational in-plane motion about a drive axis that in the initial static state is parallel to the out-of-plane direction;

the electromechanical device includes circuitry configured to generate for each of the inertial masses a first sense signal that corresponds to rotation of the inertial mass about a first sense axis that in the initial static state is parallel to the second in-plane direction, and circuitry configured to generate for each of the inertial masses a sense signal that corresponds to rotation of the inertial mass about a second sense axis that in the initial static state is parallel to the first in-plane direction.

2. An electromechanical device according to claim 1, wherein the circuitry is configured to apply first sense signals of the two inertial masses or second sense signals of the two inertial masses in combination for differential detection of rotational motion of the electromechanical device.

3. An electromechanical device according to claim 1, wherein
the out-of-plane see-saw beam system includes the beam, an attachment point of a first attachment element, and a spring structure of a second spring system, wherein
the attachment point of the first attachment element is fixed to the support;
the beam is rigid and extends in the first in-plane direction;
the beam is coupled to the attachment point of the first attachment element by the spring structure of the second spring system;
the spring structure of the second spring system is configured to twist flexibly about an axis that in the initial static state is parallel to the second in-plane direction.

4. An electromechanical device according to claim 3, wherein
the out-of-plane see-saw beam system includes also a spring structure of a third spring system;
one end of the rigid beam of the out-of-plane see-saw beam system is coupled to the horizontal edge of one of the inertial masses by the spring structure of the third spring system, and the other end of the rigid beam is coupled to the horizontal edge of the other one of the inertial masses by another spring of the third spring system;

each spring structure of the third spring system is configured to twist flexibly about an axis that in the initial static state is parallel to the second in-plane direction, to flex both in the first in-plane direction and in the second in-plane direction to enable the anti-phase rotational in-plane motion of the inertial mass systems.

5. An electromechanical device according to claim 1, wherein each of the inertial masses is coupled to a drive element, wherein
the drive element includes a linear drive element and a transform drive element,
the linear drive element is configured to be driven to a linear drive motion in one of the in-plane directions, and
the transform drive element is coupled to the inertial mass and the linear drive element and configured to convert the linear drive motion of the linear drive element into rotational in-plane motion of the inertial mass about the drive axis.

6. An electromechanical device according to claim 5, wherein each of the drive elements is disposed within a respective inertial mass.

7. An electromechanical device according to claim 5, wherein
the linear drive element includes two linear drive masses, attachment points of a second attachment element and spring structures of a fourth spring system;
the attachment points of the second attachment element are fixed to the support;
the linear drive masses are coupled to the attachment points of the second attachment element by the spring structures of the fourth spring system;
the spring structures of the fourth spring system are configured to enable linear motion of the linear drive masses in the second in-plane direction.

8. An electromechanical device according to claim 7, wherein
the second attachment element includes two pairs of attachment points, each attachment point being fixed to the support;
the linear drive masses are longitudinal beams, extending in the second in-plane direction;
a pair of spring structures of the fourth spring system couple opposite ends of each linear drive mass to a pair of attachment points of the second attachment element;
the linear drive masses are coupled to opposite vertical edges of a transform drive element by spring structures of a fifth spring system;
one of the spring structures of the fifth spring system is configured to relay a linear motion of one of the linear drive masses to one vertical edge of the transform drive element, and the other one of the spring structures of the fifth spring system is configured to relay a linear motion of the other one of the linear drive masses to the opposite vertical edges of the transform drive element.

9. An electromechanical device according to claim 8, wherein
the transform drive element includes a transform drive mass and a spring structure of a sixth spring system, wherein
the transform drive mass has the two vertical edges of the transform drive element, and two horizontal edges that extend in the first in-plane direction;
each horizontal edge of the transform drive mass is coupled to the inertial mass by a spring structure of the sixth spring system, the spring structure being configured to flex torsionally about an axis that in the initial static state is in the second in-plane direction.

10. An electromechanical device according to claim 9, wherein
the transform drive element includes also an attachment point of a third attachment element and a spring structure of a seventh spring system, wherein
the attachment point of the third attachment element is fastened to the support;
the transform drive mass is coupled to the attachment point of the third attachment element by the spring structure of the seventh spring system;
the spring structure of the seventh spring system is configured to bend in a direction that in the in the initial static state is the second in-plane direction and flex torsionally about an axis that in the initial static state is in the first in-plane direction;
the attachment point of the third attachment element and the spring structure of the seventh spring system are disposed within the transform drive mass of the transform drive element.

11. An electromechanical device according to claim 5, wherein
the linear drive element includes two linear drive masses configured to be driven in anti-phase into linear motion in the first in-plane direction;
the transform drive element includes a coupling from the linear drive masses to the inertial mass;
each of the linear drive masses is disposed outside the inertial mass.

12. An electromechanical device according to claim 11, wherein
the inertial mass has a center of rotation co-located with the drive axis of the anti- phase rotational in-plane motion of the inertial mass;
the transform drive element is configured to relay motion of a first linear drive mass of the two linear drive masses to a first coupling point in the inertial mass;
the transform drive element is configured to relay motion of a second linear drive mass of the two linear drive masses to a second coupling point in the inertial mass;
the first coupling point and the second coupling point are on opposite sides of the center of rotation in the second in-plane direction.

13. An electromechanical device according to claim 12, wherein
the transform drive element includes two longitudinal beams, each extending in the first in-plane direction from one of the linear drive masses to a coupling point in the inertial mass.

14. An electromechanical device according to claim 12, wherein the device structure includes also a central anchoring that includes an attachment point of a fourth attachment element and a spring structure of an eighth spring system configured to enable rotation of the inertial mass about a first rotation axis in the first in-plane direction and about a second rotation axis aligned in the second in-plane direction, wherein the first axis and the second axis coincide with the center of rotation.

15. An electromechanical device according to claim 5, wherein
the inertial mass has a center of rotation co-located with the drive axis of the anti-phase rotational in-plane motion of the inertial mass;
the linear drive element includes one linear drive mass that is disposed outside the inertial mass and configured to be driven into linear motion in the first in-plane direction;
the transform drive element includes a central spring structure located within the inertial mass and a longitudinal beam extending between the linear drive mass and the central spring structure in a direction that in the initial static state is the first in-plane direction;
the longitudinal beam extends from the linear drive mass to a point of connection in the central spring structure, wherein the point of connection is offset from the center of rotation in the second in-plane direction.

16. An electromechanical device according to claim 5, wherein
one out-of-plane see-saw beam system couples the inertial masses on one side of the inertial masses along the second in-plane direction;
the linear drive element for each inertial mass is on the other side of the inertial mass;
the transform drive element for each inertial mass includes an in-plane see-saw beam system, configured to transform the linear drive motion of the linear drive element into rotary motion of the inertial mass by an in-plane see-saw beam system included in the transform drive element.

17. An electromechanical device according to claim 5, wherein
the inertial mass has a cross shape formed of two orthogonally overlapping bar forms, wherein a first bar form extends in the first in-plane direction and the second bar form extends in the second in-plane direction, wherein the horizontal edges of the inertial mass are provided by ends of the second bar form, and the vertical edges are provided by ends of the second bar form;
the linear drive element is disposed into positions provided by regions between adjacent bar forms of the cross-shaped inertial mass.

18. An electromechanical device according to claim 17, wherein
the linear drive element includes two linear drive masses, each formed of a frame encircling attachment points coupling the frame to the support;
the linear drive masses are coupled to opposite vertical edges of a transform drive element by a spring of a fifth spring system;
each spring of the fifth spring system coupling a linear drive mass and the transform element is configured to relay the linear motion of the coupled linear drive mass to the vertical edge of the transform drive element.

19. An electromechanical device according to claim 18, wherein
the transform drive element includes two longitudinal beams, each extending in the first in-plane direction from one of the linear drive masses to a coupling point in the inertial mass.

20. An electromechanical device according to claim 19, wherein
the inertial mass has a center of rotation co-located with the drive axis of the anti-phase rotational in-plane motion of the inertial mass;
the transform drive element is configured to relay motion of a first linear drive mass of the two linear drive masses to a first coupling point in the inertial mass;
the transform drive element is configured to relay motion of a second linear drive mass of the two linear drive masses to a second coupling point in the inertial mass;

the first coupling point and the second coupling point are on opposite sides of the center of rotation in the second in-plane direction.

21. An electromechanical device according to claim 20, wherein the transform drive element includes two longitudinal beams, each extending in the first in-plane direction from one of the linear drive masses to a coupling point in the inertial mass.

22. An electromechanical device according to claim 5, wherein the linear drive element includes two linear drive masses, attachment points of a second attachment element and spring structures of a fourth spring system;

the attachment points of the second attachment element are fixed to the support;

the linear drive masses are coupled to the attachment points of the second attachment element by the spring structures of the fourth spring system;

the spring structures of the fourth spring system are configured to enable linear motion of the linear drive masses in the first in-plane direction.

* * * * *